US006505348B1

(12) United States Patent
Knowles et al.

(10) Patent No.: US 6,505,348 B1
(45) Date of Patent: Jan. 7, 2003

(54) MULTIPLE INTERACTIVE ELECTRONIC PROGRAM GUIDE SYSTEM AND METHODS

(75) Inventors: James H. Knowles, San Jose, CA (US); Kenneth David Johnson, Alameda, CA (US); Gordon Chang, San Jose, CA (US)

(73) Assignee: Starsight Telecast, Inc., Fremont, CA (US)

( * ) Notice: Subject to any disclaimer, the term of this patent is extended or adjusted under 35 U.S.C. 154(b) by 0 days.

(21) Appl. No.: 09/363,575

(22) Filed: Jul. 29, 1999

Related U.S. Application Data
(60) Provisional application No. 60/135,004, filed on May 20, 1999, provisional application No. 60/123,294, filed on Mar. 4, 1999, and provisional application No. 60/094,564, filed on Jul. 29, 1998.

(51) Int. Cl.[7] .............................. H04N 5/445; H04N 7/16
(52) U.S. Cl. .............................. 725/49; 725/78; 725/28; 725/29; 725/30
(58) Field of Search .............................. 725/49, 48, 50, 725/54, 55, 39, 44, 47, 52, 53, 56, 78, 74, 120, 28, 29, 30; H04N 7/16, 7/173, 5/445

(56) References Cited

U.S. PATENT DOCUMENTS

| 5,036,314 A | 7/1991 | Barillari et al. .............. 340/717 |
| 5,105,184 A | 4/1992 | Pirani et al. .................. 340/721 |
| 5,155,591 A | 10/1992 | Wachob ........................ 358/86 |
| 5,223,924 A | 6/1993 | Strubbe ........................ 358/86 |
| 5,233,423 A | 8/1993 | Jernigan et al. ............. 358/181 |
| 5,319,445 A | 6/1994 | Fitts ............................ 356/376 |
| 5,325,183 A | 6/1994 | Rhee ............................ 348/528 |
| 5,377,317 A | 12/1994 | Bates et al. .................. 395/157 |
| 5,398,074 A | 3/1995 | Duffield et al. ............. 348/564 |
| 5,410,344 A | 4/1995 | Graves et al. ................. 348/1 |
| 5,440,678 A | 8/1995 | Eisen et al. .................. 395/154 |
| 5,479,497 A | 12/1995 | Kovarik ....................... 379/265 |
| 5,523,796 A | 6/1996 | Marshall et al. ............. 348/589 |
| 5,524,195 A | 6/1996 | Clanton, III et al. ........ 395/155 |
| 5,526,034 A | 6/1996 | Hoarty et al. .................. 348/7 |
| 5,534,911 A | 7/1996 | Levitan ......................... 348/1 |

(List continued on next page.)

OTHER PUBLICATIONS

PCT Notification of Transmittal of International Search Report, Intl. Application No. PCT/US00/05887, Aug. 2000, (4 pages).

*Primary Examiner*—Chris Grant
(74) *Attorney, Agent, or Firm*—Christie, Parker & Hale, LLP

(57) ABSTRACT

A multiple Interactive Program Guide (IPG) system provides different television programming and different IPGs to several different users respectively. A single set-top box is capable of providing programming and scheduling data to several different television sets. Each of the different IPGs share a common database. Therefore, a first IPG being viewed by a first user can display data added or modified via a second IPG by a second user of the system. Furthermore, the data added or modified by the second user can influence the viewing rights of the first user. Also, all the competing and conflicting requests for limited resources, such as VCR scheduled recordings, will be brought to the users' attention and will be displayed by the system.

26 Claims, 37 Drawing Sheets

U.S. PATENT DOCUMENTS

| | | | | |
|---|---|---|---|---|
| 5,541,662 A | | 7/1996 | Adams et al. | 348/460 |
| 5,557,338 A | | 9/1996 | Maze et al. | 348/565 |
| 5,559,548 A | | 9/1996 | Davis et al. | 348/6 |
| 5,559,549 A | | 9/1996 | Hendricks et al. | 348/6 |
| 5,559,550 A | | 9/1996 | Mankovitz | 348/6 |
| 5,583,560 A | | 12/1996 | Florin et al. | 348/7 |
| 5,585,838 A | | 12/1996 | Lawler et al. | 348/13 |
| 5,585,866 A | | 12/1996 | Miller et al. | 348/731 |
| 5,594,509 A | | 1/1997 | Florin et al. | 348/731 |
| 5,600,364 A | | 2/1997 | Hendricks et al. | 348/1 |
| 5,621,456 A | | 4/1997 | Florin et al. | 348/7 |
| 5,625,406 A | * | 4/1997 | Newberry et al. | 725/49 |
| 5,629,733 A | | 5/1997 | Youman et al. | 348/7 |
| 5,630,119 A | | 5/1997 | Aristides et al. | 395/601 |
| 5,635,978 A | | 6/1997 | Alten et al. | 348/7 |
| 5,635,989 A | | 6/1997 | Rothmuller | 348/563 |
| 5,650,826 A | | 7/1997 | Eitz | 348/468 |
| 5,650,831 A | | 7/1997 | Farwell | 348/734 |
| 5,652,613 A | | 7/1997 | Lazarus et al. | 348/7 |
| 5,652,615 A | | 7/1997 | Bryant et al. | 348/9 |
| 5,661,516 A | | 8/1997 | Carles | 348/8 |
| 5,666,498 A | | 9/1997 | Amro | 345/342 |
| 5,684,525 A | * | 11/1997 | Klosterman | 725/49 |
| 5,689,666 A | | 11/1997 | Berquist et al. | 395/345 |
| 5,710,601 A | | 1/1998 | Marshall et al. | 348/564 |
| 5,734,853 A | | 3/1998 | Hendricks et al. | 395/352 |
| 5,751,282 A | | 5/1998 | Girard et al. | 345/327 |
| 5,801,787 A | * | 9/1998 | Schein et al. | 725/49 |
| 5,805,204 A | | 9/1998 | Thompson et al. | 348/13 |
| 5,828,945 A | * | 10/1998 | Klosterman | 725/49 |
| 5,982,411 A | * | 11/1999 | Eyer et al. | 725/49 |
| 6,157,411 A | * | 12/2000 | Williams et al. | 725/49 |
| 6,305,018 B1 | * | 10/2001 | Usui et al. | 725/49 |

\* cited by examiner

FIG. 5

| Thu Sep 17 | 12:00 a |
|---|---|
| VD01 151 | Wag |
| 70S 624 | 70's S |
| TCM | The |

<MSO NAME>

Thu Sep 17 | 12:00 am | 12:30 am | 1:00 am

| | | | |
|---|---|---|---|
| VD01 151 | Wag the Dog | | |
| 70S 624 | 70's Super Hits | | |
| TCM | The Tunnel of Love | | |
| LOCL 701 | Local Programming | | |
| ☆SPN 105 | ESPNEW | ESPNEW | ESPNEW |
| 📖HBO2 201 | Indiscreet | | Back From M |
| HBO3 202 | Lifeform | | What About Y |
| VD02 152 | Sphere | | |
| SHO2 203 | Children of a Lesser God | | |
| 📖MC 204 | So I Married an Axe Murderer | | |
| HBO2 251 | Valentine' | Bloodsport III | |

You are tuned to VD01, CH 151     12:32 am

Tabs: Menu | PPV | Grid Guide | Themes | What's New

STAR SIGHT

Looking for that great movie?
(Click here)
*StarSight Themes*

You've got to find that game NOW
🏈
*StarSight Themes*

130

| | Menu | PPV | Grid Guide | Themes | What's New |
|---|---|---|---|---|---|

Caller ID Log — 188

| | PHONE# | DATE OF CALL | TIME |
|---|---|---|---|
| Loral Treasonous | (800) 976-0029 | Fri Aug 7 | 1:06pm |
| Filley Gatous | 976-0028 | Fri Aug 7 | 1:05pm |
| Jan Renot | (800) 976-0027 | Fri Aug 7 | 1:03pm |
| Ami Taxpayerous | 976-0026 | Fri Aug 7 | 1:03pm |
| Joan Paulinski | (800) 976-0025 | Fri Aug 7 | 1:02pm |
| -not available- | 976-0024 | Fri Aug 7 | 1:01pm |
| Lew Moanski | (800) 976-0023 | Fri Aug 7 | 1:00pm |

FIG. 28

Scheduled Events List

| Menu | PPV | Grid Guide | Themes | What's New |

| EVENT | | SCHEDULE | TIME | DUR. |
|---|---|---|---|---|
| Sphere | Purchase $ | Wed Sep 16 | 10:00 pm | 2:30 |
| Wag the Dog | Purchase $ | Thu Sep 17 | 12:00 pm | 2:00 |

This show is on ch. 152, VCD02

*FIG. 31*

"ELIZABETH" HAS ALREADY BEEN SCHEDULED TO BE PURCHASED AND VIEWED ON MONDAY, MAY 17, 1999. IF YOU WANT TO CANCEL THIS REQUEST PRESS "CANCEL." IF YOU WANT TO OVERRIDE THE SHEDULED PROGRAM, PRESS "OVERRIDE."

CANCEL    OVERRIDE

GUIDEPLUS+

PRESS THE SELECT KEY ON THE REMOTE TO BLOCK SHOWS BY
TV PARENTAL GUIDELINES RATINGS.
*NOTE:TO BLOCK SHOWS BY MPAA MOVIE RATINGS,
SCROLL DOWN TO THE MOVIE RATINGS TILE.*

GRID  SORT  VCHIP+  SCHEDULE

TV RATINGS
MOVIE RATINGS
GRID
SORT
TIME
FEATURES
PASSWORD

10:03PM

PIP WINDOW

DISPLAYING REAL TIME
VIDEO FOR LAST
CHANNEL VIEWED

AD WINDOW 1

DISPLAYING PANEL AD

AD WINDOW 2

DISPLAYING PANEL AD

MULTIPLE INTERACTIVE ELECTRONIC PROGRAM GUIDE SYSTEM AND METHODS

CROSS REFERENCE TO RELATED APPLICATIONS

This application claims priority to the following applications: provisional Application No. 60/094,564, filed Jul. 29, 1998, entitled "Interactive Program Guide Product Definition"; Provisional Application No. 60/123,294, filed Mar. 4, 1999, entitled "Electronic Program Guide System and Methods for Displaying Programs and Advertising"; and provisional Application No. 60/135,004, filed May 20, 1999, entitled "Multiple Interactive Program Guides." The above-identified applications being incorporated by reference as if fully set forth herein.

FIELD OF THE INVENTION

The present invention relates generally to electronic interactive program guides (IPGs), and more particularly to a system for managing and displaying multiple IPGs.

BACKGROUND OF THE INVENTION

The earliest versions of on-screen electronic program guides (EPG) provided for the storage of program schedule information in an electronic memory connected to a television (TV) receiver and generally provided for the on-screen formatting and display of the program schedule information on the TV screen. The early EPGs typically overlaid the TV programming and were extremely limited as to viewer interaction.

Later EPGs provided improvements in viewer EPG interaction and also provided a Picture-In-Guide ("PIG") display of the TV program simultaneous with the display of the EPG. International Application No. PCT/US95/11173 (International Publication No. WO 96/07270), the disclosure of which is incorporated by reference herein for all purposes, illustrates such an improvement. However, each of these IPGs requires a set-top box or a computer. Thus, in a household with several TV sets, several set-top boxes are needed. This increases the cost of having multiple TV sets in a house. Additionally, different users with different TV watching tastes and habits do not have the flexibility of customizing an IPG to their needs. Furthermore, it is difficult and time-consuming for parents to exercise parental control over several IPGs that are not related to and do not communicate with each other.

Therefore, there is a need for a multiple IPG system in a single set-top box or a single computer wherein the IPGs share some data and are capable of notifying users of any competing and conflicting resources. There is also a need for a centralized parental control over the multiple IPGs.

SUMMARY OF THE INVENTION

The present invention relates to a multiple IPG system. Embodied in a single set-top box, the system provides different TV programming and different IPGs to several different users respectively. The single set-top box is capable of providing programming and scheduling data to several different TV sets. Moreover, each of the different IPGs share some common data stored in a common database with each other. Therefore, a first IPG being viewed by a first user can display data added or modified via a second IPG by a second user of the system. Furthermore, the data added or modified by the second user can influence the viewing rights of the first user. Also, all the competing and conflicting requests for limited resources, such as VCR scheduled recordings, are brought to the users' attention and displayed or prompted by the system.

DESCRIPTION OF THE DRAWINGS

FIG. 5 is an IPG system page when the user presses GUIDE while viewing TV.

FIG. 6 is a screen for when the beginning of a show appears to extend beyond the left edge of the guide.

FIG. 7 is interactive promotions within an IPG.

FIG. 28 is a Caller ID Log.

FIG. 31 is a television screen displaying a Scheduled Events List.

FIG. 32 is a television screen displaying a prompt window for notifying a user who is requesting a PPV purchase that has already been scheduled.

FIG. 33 is a television screen displaying VCHIP Plus+ functions.

DETAILED DESCRIPTION

Overall System

An embodiment of the invention is a system that provides customers with multiple instantly accessible electronic IPGs. The multiple IPG system enables users to view TV programs and schedule information in each IPG. Preferably, each IPG comprises a Grid Guide, a Channel Guide, and a Theme Guide. Each IPG receives, stores, and displays program titles and information and share some of the information with other IPGs. The format and some features of an IPG are described in the U.S. patent application Ser. No. 09/120,488, filed on Jul., 21, 1998 and entitled "SYSTEMS AND METHODS FOR DISPLAYING AND RECORDING CONTROL INTERFACE WITH TELEVISION PROGRAMS, VIDEO, ADVERTISING INFORMATION AND PROGRAM SCHEDULING INFORMATION" the disclosures of which is hereby incorporated by reference as if set forth herein in its entirety.

Preferably, the multiple IPGs are embodied in a single set-top box. In an alternative embodiment, the IPGs may reside in a single computer connected to multiple TV sets or multiple displays. In yet another embodiment, the IPGs may reside in a single electronic device with capabilities for displaying TV programs on multiple TV sets. The IPGs may reside on a device which is capable of downloading the IPGs into another device which can display the IPGs on multiple TV sets or multiple displays. In yet another embodiment, the IPGs may reside in multiple electronic devices or set top boxes, however, they would still share data such as an Scheduled Events List including, for example, an aggregate list for all individual recordings and series recordings, future PPV purchases, and scheduled tunes.

An IPG user uses a remote control with IPG keys labeled GUIDE, INFO, etc. to display colorful, high-resolution program guides, screens, and pop-ups on the TV. Each IPG can be configured to allow the user to search programs by time and theme to get additional information about programs, and to browse to see what is on other channels while still watching a program.

Each IPG can be configured so that users can tailor their channel lineup by blocking out channels they seldom watch and placing their favorite channels at the beginning of the list.

Figure 1A:
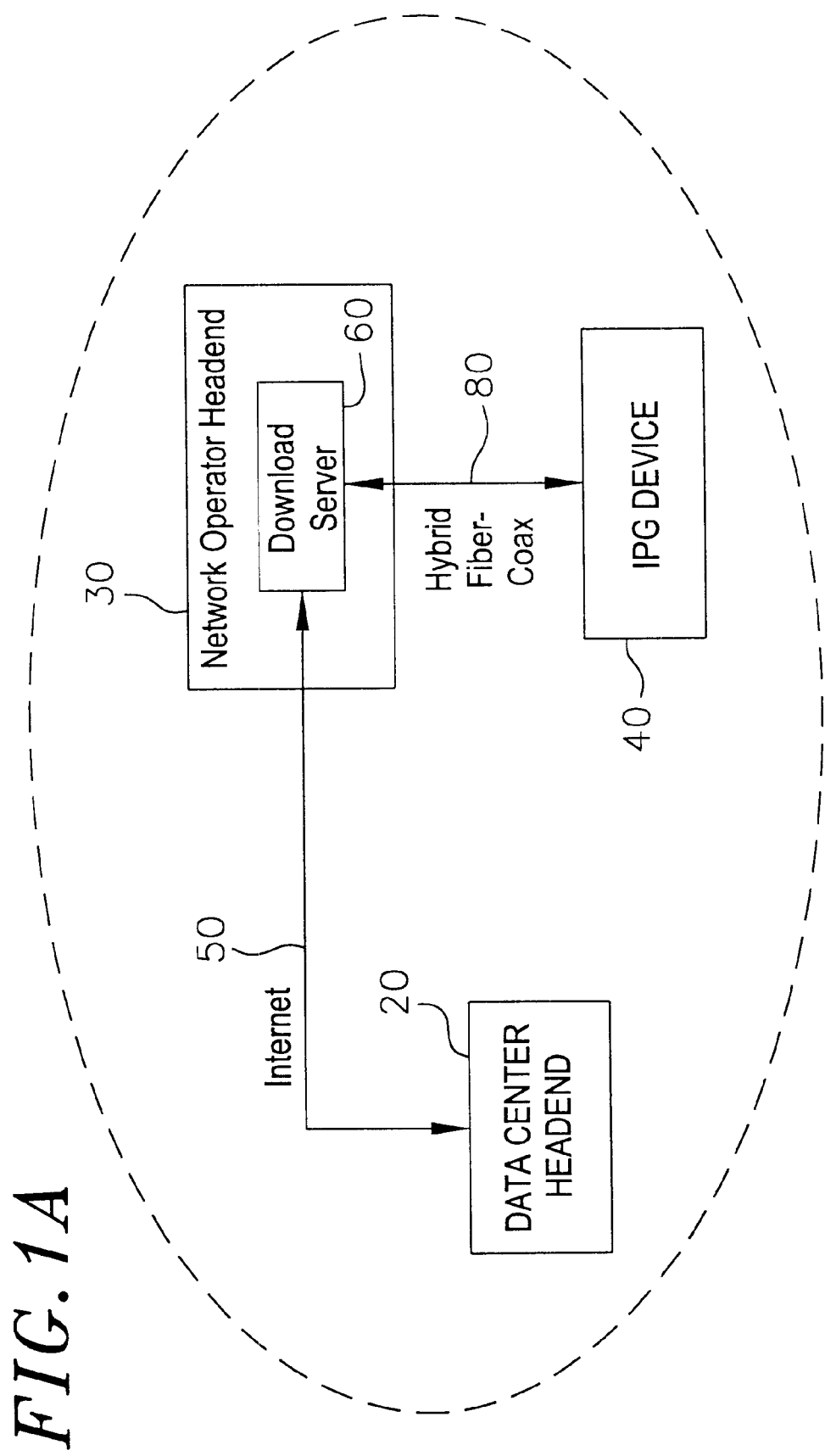
FIG. 1A is a network of a data center head end, a network operator head end, and an IPG device.

The multiple IPG system includes a comprehensive network of data centers and data broadcasting equipment that enables users to receive program data in their homes. FIG. 1 shows a network 1 of a data center headend 20, a network operator headend 30, and an IPG device 40.

In one embodiment of the invention, a data center headend receives updated program information from multiple data sources.

The data from various sources is merged at the data center headend in preparation to be sent to the network operators. The data is sent, using the FTP protocol, from the data center headend via the Internet 50 to the Download Server 60 of the network operator head end and then sent via hybrid fiber-coax 70 to an IPG device. The network operator headend receives the most recent schedule data whenever it downloads data from the data center headend.

The network operator can specify the number of days of program information displayed in the guides, the number of channels covered in the guides, and the amount of show descriptions. The network operator can also specify the number of formats of the guide.

If an IPG is configured to manage and control VCR recordings, then the IPG device includes an infrared signal transmitter used to send infrared commands to the VCR. If the IPG is configured to exclude an automatic recording feature, then the IPG device does not need to include an infrared signal transmitter.

An IPG user interacts with the respective IPG by using a remote control to send commands to the respective receiver in an IPG device. In one embodiment, the receiver is an infrared or UHF receiver. An example command is the GUIDE command. The Grid Guide displays program information in a grid format. To view the Grid Guide, an IPG user presses the GUIDE key on the remote control; the command is sent to the infrared or UHF receiver and then the IPG device passes a key to the IPG, which displays the Grid Guide.

The Grid Guide displays a grid of program title, channel, and time slot information for a configurable number of channels. The guide displays information for the current day and up to N days in the future, depending on the amount of memory available. In one embodiment, N is six days. Each IPG can display Music Choice channels in the Grid Guide and allow the user to tune to these channels or lock them out.

Each IPG provides the user with an interface including a variety of colorful, high-resolution on-screen program guides, screens, and pop-up windows that the user displays by pressing keys on the remote control. An IPG may vary depending on the amount of memory allocated for schedule information and the feature set specified by the network operator. Depending on the amount of memory available and the specification of the network operator, the number of days and channels displayed in the guides and the amount of program descriptions can vary.

Each IPG can be configured so that users can see additional information, such as plot, actors, and rating for a program by pressing the INFO or SELECT keys while viewing a guide. The IPG can also include capabilities that allow the user to schedule VCR recordings from a guide. While the cursor is on one of the programs in a guide, the user presses INFO or SELECT to display the Info pop-up for that program.

Programs can be searched by theme using the IPG Theme Guide selection. The Theme Guide selection enables users to select programs by category and sub-category, rather than just by time, channel, or title. Once the user selects a category, such as MOVIES, and then selects a sub-category, such as ALL MOVIES, the programs that fit the sub-category are displayed on the Theme Guide. Once in the Theme Guide screen, the user can sort programs by time, by channel, and alphabetically. The network operator can configure and manipulate the theme categories and sub-categories for the Theme guide.

Each IPG can be configured to allow users to tailor the program guides by selecting which channels to display in the guides and which channels the respective IPG device tunes to when the user channel surfs. Users can deselect channels that they seldom watch. Deselected channels are not displayed on the guides and are skipped over when the user tunes with the CH↑ or CH↓ keys on a remote control. Users can change the channel order to place their most watched channels at the top of the list. Users can also select channels through the Favorite Channels screen. The respective IPG tunes through the Favorite channels when the user presses FAV while watching TV.

Users can tune and browse channels. From any of the guides, a user can tune to another channel by highlighting a program title, pressing INFO or SELECT to display the INFO pop-up, and then selecting the "TUNE" button on the pop-up.

To tune while watching TV, the user presses CH↑ or CH↓ and the system tunes to the next or previous channel in the customized channel order or default channel map.

Users can also "browse" through channels to see what is on other channels while keeping the TV tuned to the program they are still watching. By pressing the ↑ or ↓ arrow keys on a remote control while watching TV, the user can see the title, time, description, and duration of the program on the next or previous channel.

Each IPG includes a full menu system that allows the user to set up the IPG functions, such as screen display position, and user preferences. An example of an IPG screen function is the Adjust Display Position screen function. Another feature of each IPG is Internet access which can be set up from an IPG menu.

Each IPG includes a Parental Control feature that allows the user to block TV viewing. For example, the user can lock entire channels; lock the IPG entirely, so that no functions may be used; and limit Interactive Pay Per View (IPPV) purchasing.

Each IPG enables a user to purchase current and future IPPV programs. IPPV programs, descriptions, and buying information are displayed in the guides. Each IPG also enables network operators to display operator messages.

The user can set up a parental control password and a purchase password. To use parental control, the user must first set up a parental password. The user does not have to set up a purchase password to make impulse PPV purchases. If the user does set up a purchase password, the system requires the user to enter the password to complete the purchase.

Each IPG contains stored barkers that can be used when certain channel status criterions are met. A barker is a message displayed on the screen which can provide information to the user or indicate action(s) for the user to take. The operator can also set up video barkers to be used instead of stored barkers.

Each IPG can display Caller ID and Message Waiting information in both the TV state and when a guide is displayed. In addition, user preferences and a Caller ID Log are available in a Main Menu.

IPG screens and pop-ups are displayed in the industry safe title area of the TV screen. Preferably, each IPG display uses a high resolution pixel-based display.

The multiple IPG system is multi-source. Multiple MPEG streams are delivered to multiple TV sets throughout a house, with each stream (or "source") modulated to a different channel. In one embodiment, the multiple IPG system provides independent instances of the IPG, one for each source. In a preferred embodiment, the system provides interdependent IPGs, one for each source. In the latter embodiment, each of the different IPGs share some common data stored in a common database with each other. Also, each IPG includes data unique to that specific IPG. Therefore, a first IPG being viewed by a first user can display data added or modified via a second IPG by a second user of the system. Furthermore, all the competing and conflicting requests for limited resources, such as VCR scheduled recordings, are brought to the users' attention and displayed or prompted by the system.

For example, a comprehensive list of pay-per-view (PPV) scheduled times and/or future purchases for all of the users can be displayed by any user on any TV. In addition, if a first user attempts to order a PPV program that has already been ordered by a second user, the system prompts the first user with the information about the already placed (or scheduled to be placed) order. Furthermore, if a first user schedules recording of a first program and a second user attempts to schedule recording of a second program that will be telecast at the same time, the system prompts the second user and display the recording schedules stored by all the users.

Moreover, parental control blocking criteria by a user (with master password) influences other users' viewing of the programs. For example, if a first user attempts to view a program that meets a blocking criterion set by a second user (with master password), the program will be blocked and the first user will be prevented from viewing the program.

The multiple IPGs support a hierarchy of multiple user passwords. For example, in a household, the parents may have the highest level of password (a master password), the teenager may have a second level password, and the younger children may have lower levels of passwords. A user with a higher level password may override the changes made users with lower level password. A user with a master password can override the changes made by all other users. A user with the master password sets the priorities for other passwords based on other user names and/or user profiles. Each password is stored in a respective memory location. Upon entry of a password, the microprocessor determines the priority of the entered password and the privileges assigned to that password based on the respective user profile or information associated with the password stored in the memory.

A set-top box permits multiple MPEG streams (sources) to be simultaneously delivered and distributed throughout a household (for simplicity reasons, a three source set-top box is discussed, the invention is easily extendable to several source set-top boxes). These streams are each modulated to a different channel, so that any of the multiple streams may be viewed at a given location. Multiple independent IPGs, one for each source are provided. Each IPG has its own user-configurable data such as channel lineup, list of favorite channels, and set of passwords. The IPGs share a common database and in many instances, interact with each other.

IPGs can also be customized by and be particular to specific users. A specific user identifies him-/herself by entering a user name and the associated password into an appropriate field in a displayed screen when a TV receiver is turned on. Once the user is identified, the respective IPG is displayed for the identified user. In the alternative, the IPGs are particular to each source, i.e., no matter which user is identified, a specific IPG is displayed depending on which TV set is turned on.

Figure 1B:
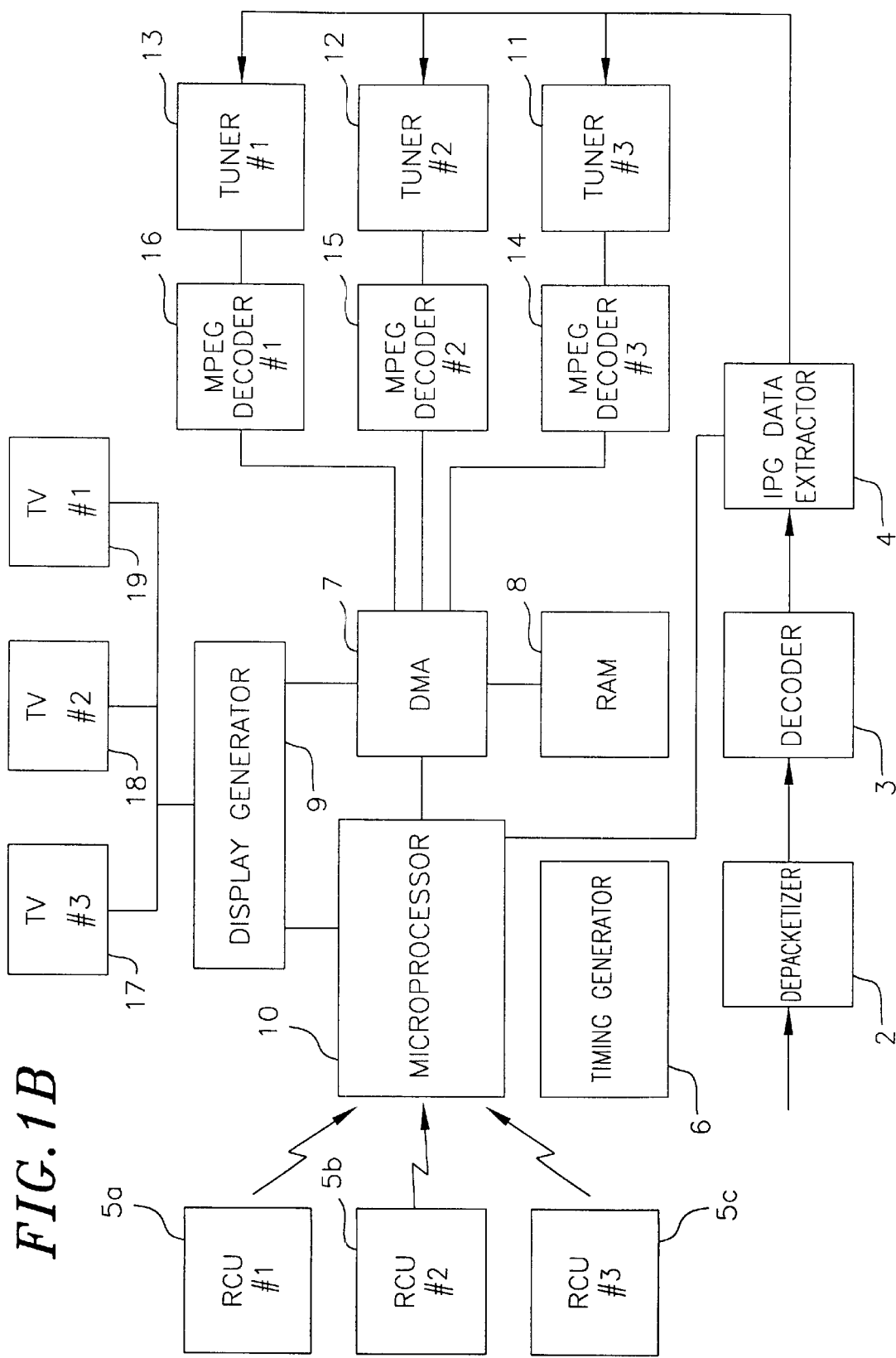
FIG. 1B is a block diagram of a set-up box that supports three sources and three TV sets.

FIG. 1B is a block diagram of the components of an embodiment of the invention provided in a single set-top box that feeds conventional TV receivers or monitors 17, 18, and 19. The set-top box receives digital TV signals and converts them into analog video and audio drive signals. The digital TV signals are arranged in packets according to an established standard format, such as ATSC. The components include a microprocessor 10, a memory controller or direct memory access (DMA) device 7 coupled to the microprocessor 10, RAM 8 coupled to the DMA device 7 and the microprocessor 10, synchronization (synch) and timing circuitry 6 coupled to all of the components, data depacketizer 2, decoder 3 coupled to the depacketizer 2, IPG data extractor 4 coupled to the decoder 3 and the microprocessor, tuners 11–13 coupled to the IPG data extractor 4, MPEG decoders 14–16 coupled to the tuners 11–13, display generator 9 coupled to the microprocessor and the DMA device, and TV receivers 17–19 coupled to the display generator 9.

The microprocessor 10 configures and coordinates the activities of all of the other components in the set-top box via two-way communication paths without participating in any data movement operations. Microprocessor 10 is programmed to operate in a multi-tasking mode, in which the video and audio drive signals, including the TV program signals and the IPG signals, for monitors 17, 18, and 19 are generated. The microprocessor 10 accesses RAM 8 using DMA controller 7 as a proxy by providing address information and either providing data (in the case of a write) or receiving data (in the case of a read).

Preferably, there is only one RAM, although this invention works with any number of RAMs. RAM 8 is accessed by four different components: the microprocessor 10, the IPG data extractor 4, MPEG decoders 14–16, and the display generator 9. The DMA is a multiplexing and arbitrating circuit that facilitates the sharing of the RAM 8 by switching access between the four components. The DMA may include buffer memory to temporarily store data input from out-of-turn components between access cycles. The DMA 7 stores text and video data in the correct addresses in the RAM 8 and then retrieves the appropriate data from a selected address from the RAM 8 when needed.

As the digital data streams are received, they are depacketized by the depacketizer 2 resulting in audio, video, and auxiliary (including the IPG data) data streams. Decoding, error detection, and error correction functions are performed by the decoder 2. The IPG data is then extracted from the data stream by the extractor 4 and is stored in the RAM 8. The data stream is fed to the three tuners 11–13 and the output of each tuner is decoded by the MPEG decoders 14–16. The decoded audio and video data is then fed to the display generator 9 (or stored in the RAM 8) by the DMA 7. The display generator 9 then outputs the video and audio data to the respective TV receiver 17–19. The timing circuitry 6 provides the timing and synchronization signals for all the components.

The data for the multiple IPGs is stored in the system RAM 8 which is coupled to the MPEG decoders 14–16 through the DMA controller 7. Preferably, common data to all IPGs is stored in a segment of the RAM that is accessible by all the IPGs. Data specific to each IPG based on a particular user or based on a particular TV set is stored in other segments of the RAM 8 and is accessible by respective IPGs. Examples of data specific to an IPG are; guide customizations such as channel orders, channel set up, format of the guide, and background colors. RAM 8 also functions to buffer the digital data associated with the audio and video data of a given channel for each tuner.

Microprocessor 10 operates to periodically update the multiple IPGs stored in the system RAM 8. IPGs are particular to specific users and/or particular to specific TV set. When a user decides to display a particular IPG, display generator 9 under the control of microprocessor 10 retrieves the IPG common data and the IPG specific data from RAM 8 through DMA controller 7. The display generator then outputs the particular IPG to the respective TV receiver.

In an exemplary embodiment, display generator 9 includes the functions of a VCHIP for each TV receiver. Accordingly, any TV program that meets a blocking criterion is blocked from the respective TV display. In another exemplary embodiment there are preferably three VCHIPS coupled to the respective MPEG decoder, microprocessor, and the display generator.

Figure 1C:
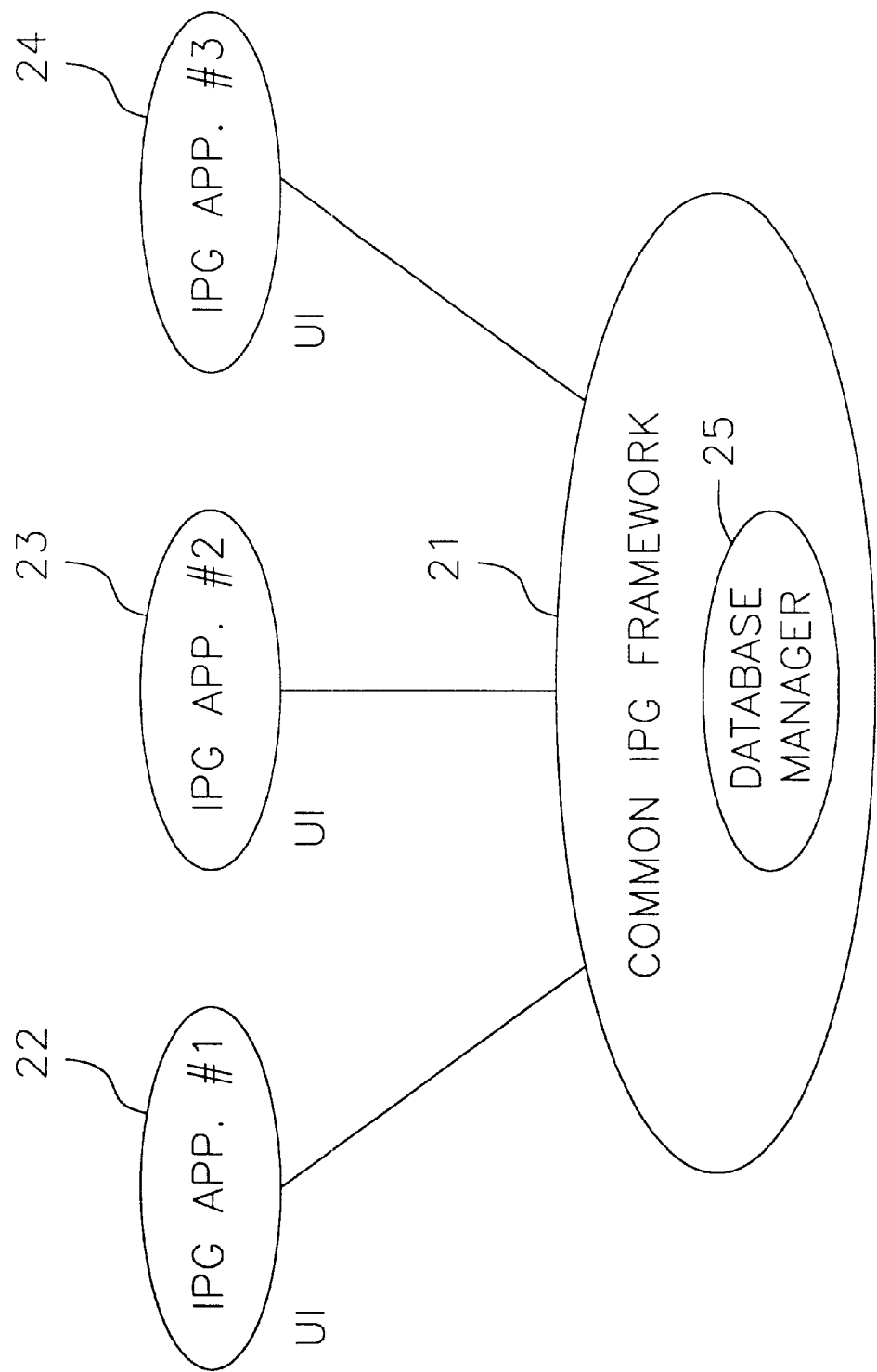
FIG. 1C is a block diagram of a software architecture for a system that supports three IPGs.

FIG. 1C shows a block diagram of a software architecture for the present invention. The IPG data is stored and organized in a common IPG framework 21. The IPG data is shared between the three IPG applications 22–24. The common IPG framework 21 includes an IPG database manager 25 that responds to the data requests from each of the IPG applications 22–24. Each of the IPG applications 22–24 include a user interface (UI) for accepting data from a user and a graphics generator for displaying data in a guide format. The IPG database manager 25 in the common IPG framework 21 keeps track of all the changes to the IPG data by each user. In summary, the IPG data for all three monitors are stored in one place, i.e., RAM 8, commands from all three remote control units (RCU's) 5a, 5b, and 5c are received and processed by one processor, i.e., microprocessor 10, and the individual IPG images formed responsive to the commands from all three RCU's are generated in one display generator, i.e., display generator 9.

A scheduled events list includes an aggregate list for all individual recordings and series recordings, future PPV purchases, and scheduled tunes. FIG. 31 shows an example of a scheduled events list. The information included in the scheduled events list may be kept at the network level or kept at the user level. The present invention includes a UI including the scheduled events list. The network provides the UI with event IDs for any shows that are scheduled to be purchased, and the UI displays the titles for those IDs. The scheduled events list is shared by all the users. In one example, the programs are listed in chronological order by date and time. Current events, if there are any, are listed at the top, and then the next events scheduled to occur are listed below them. From this screen, the users can do the following:

View the programs scheduled for purchasing;

Notice any conflicts with the programs scheduled for purchasing;

Get information for programs scheduled for purchasing; or

Cancel programs scheduled for purchasing.

Each user is provided with the same scheduled events list. If a user orders a PPV program, the guide displays the scheduled event in the guides and in the scheduled events lists for all three sources. If a user cancels a scheduled purchase, the purchase is no longer displayed in any of the guides or any of the scheduled events lists. However, if the purchase was scheduled by a different user, the canceling user must have a higher priority password to be able to cancel the scheduled event. This prevents a user from unknowingly purchasing the same program twice, or from canceling one instance of a purchase and unknowingly allowing another instance of the purchase to occur. In case of a conflict, the program in conflict is highlighted in this screen. In addition a new pop up (prompt) screen may appear notifying the user about the conflict.

FIG. 32 shows an example of a prompt window for notifying a second user who is requesting a PPV purchase that has already been scheduled. In this example, unknown to the second user, a first user had requested to purchase "Elizabeth" as a PPV program to be viewed at a first time schedule. The system notifies the second user about the conflict and asks the second user if he/she wants to override the first user's scheduled event. Only a user with higher password level than that of a first user can override the first user's request for a conflicting resource. If the second user has a higher priority password, he/she can reschedule the telecast time of "Elizabeth."

In general, a major advantage of the IPG in the multi-source architecture is in allowing users to use multiple (three as an example) instances of the IPG simultaneously. This includes, but is not restricted to, the following:

1. Users can view three different channels simultaneously.

2. Users can have three separate "custom channels" lists (so that the parent's bedroom may have an entirely different list of channels, ordering of channels, and favorite channels than the children's bedroom).

3. Users may have three separate groups of parentally-controlled channels and passwords. This would mean that the parents can prohibit Cinemax (for example) from being displayed on the TV in the children's bedroom but may watch it in their own bedroom.

4. Users may have three different AutoTunes occurring at once without conflict. For example, the living room TV may tune itself to "Friends" while the children's TV tunes itself to "Barney" simultaneously. This would be a conflict in a single-source environment.

The multiple IPGs use their common database to interact with each other to solve any potential conflicts. The following are some examples in which the guides must interact with each other, in order to avoid unsolvable difficulties with the user interface:

1. Because Pay-Per-View ordering is handled at the network end, the IPG maintains no independent knowledge of the circumstances of PPV purchases, and displays the results of an aggregate list of purchases provided by the network. If a user orders a PPV program for one source, the guide displays the scheduled event in the guides and in a scheduled Events List for all three sources. If a user cancels a scheduled purchase, the purchase is no longer displayed in any of the guides or any of the Scheduled Events Lists. This prevents a user from unknowingly purchasing the same program twice, or from canceling one instance of a purchase and unknowingly allowing another to occur.

2. If the user forgets his or her password and calls the service provider to reset the password, the passwords for all three sources will be reset and must be reentered individually. This prevents a user from making multiple phone calls to the service provider to reset the passwords on each source.

3. When the user displays a Caller ID Log (see below), the IPG will show an aggregate list. If two users have the Caller ID Log displayed on different sources and one user deletes a message, the deletion will not occur on the log of the other source until that user closes the log.

Parental Control Features

All of the multiple IPGs are capable of supporting the features of VCHIP Plus+ described in a co-pending patent application Ser. No. 09/221,615 ("VCHIP PLUS; PARENTAL CONTROL APPARATUS AND METHOD"), filed Dec. 28, 1998, the disclosures of which is incorporated herein by reference, as if fully stated here, for all purposes.

VChip Plus+ in guide mode uses two data sources in combination to determine whether a show should be blocked: data downloaded and stored in the guide (channel lineups, show schedules, show ratings), and rating data transmitted over the VBI. Ordinary V-Chip devices use the data transmitted over the VBI to determine whether or not to block a show by rating. These ratings are sent a minimum of every 15 seconds. Thus, a show that a parent may wish blocked, may be seen for up to 15 seconds before the blocking takes effect. VCHIP Plus+ in guide mode uses show rating data already stored for each of the IPGs to determine whether a show should be blocked as soon as it begins, and use the VBI data to confirm if the show was properly blocked. If it was blocked in error, then the block is removed. In the event the respective guide does not have rating data stored on a given show, the show will be accessible, until the VBI data is obtained and a blocking decision is made.

Shows of participating networks except news and sports programming are rated with either a TV Parental guideline rating or an MPAA rating (for movies that have not been modified for TV). However, VCHIP Plus+ provides the ability for the user to block unrated programming. The intent is to give parents control over whether they wish their children to watch the potentially objectionable content of some news and sports programs.

Each IPG requests that the user provide certain profile information. Some of the information provided by the user are specific to the set-top box and the same for all the IPG such as: the user's zip code; TV, cable, and satellite services to which the user subscribes; the length of said subscriptions. Other information is specific to each user or each TV set such as the type of TV; the age of the TV; the user's top favorite channels; the user's favorite types of programs; and the times during which the user is most likely to watch TV. If the user declines to provide this information, each IPG attempts to "learn" the information as described in a co-pending patent application Ser. No. 09/120,488 ("SYSTEMS AND METHODS FOR DISPLAYING AND RECORDING CONTROL INTERFACE WITH TELEVISION PROGRAMS, VIDEO, ADVERTISING INFORMATION AND PROGRAM SCHEDULING INFORMATION"), filed Jul. 21, 1998, the disclosures of which is incorporated herein by reference, as if fully stated here, for all purposes.

When the TV is powered on, the display depends upon whether Auto-Guide-On is activated, the entry show has been blocked, or the TV remote or front panel was used to turn on the TV. If Auto-Guide-On is activated, the respective IPG appears when a TV is turned on. If a Master Password has been set, the user has access to shows, features and screens provided by the User Profile. In one embodiment, all shows, channels, times, etc. that are blocked are so marked within the respective IPGs. In an alternative embodiment, the blocked shows do not appear in the respective IPGs. The user has access to all unrestricted shows and features and screens of the guide without the need to enter a password. Upon attempting to access a restricted show (by pressing the OK or Guide key), feature (recording via action buttons, any enabled buttons on the remote—likely the record button—and via the VCRPlus+ key) or screen (scrolling into or pressing OK from menu bar), a password dialog box appears on the screen. If the user correctly inputs the Master Password, the user obtains access to all shows, areas of the respective guide and features. If the user does not input the Master Password, that user maintains access as defined by the User Profile. All user profiles can be modified by a user with a master password.

If Auto-Guide-On is not activated, the respective IPG does not appear when the TV is turned. If a Master Password has been set, the user has access to shows, features and screens provided by the User Profile. If the entry show has not been blocked, the show video appears on screen. If the entry show has been blocked, a password dialog box appears on the screen. Again, if the users correctly input the Master Password, they obtain access to all shows, areas of the guide and features. If the users do not input the Master Password, they maintain access as defined by the User Profile.

Figure 34:
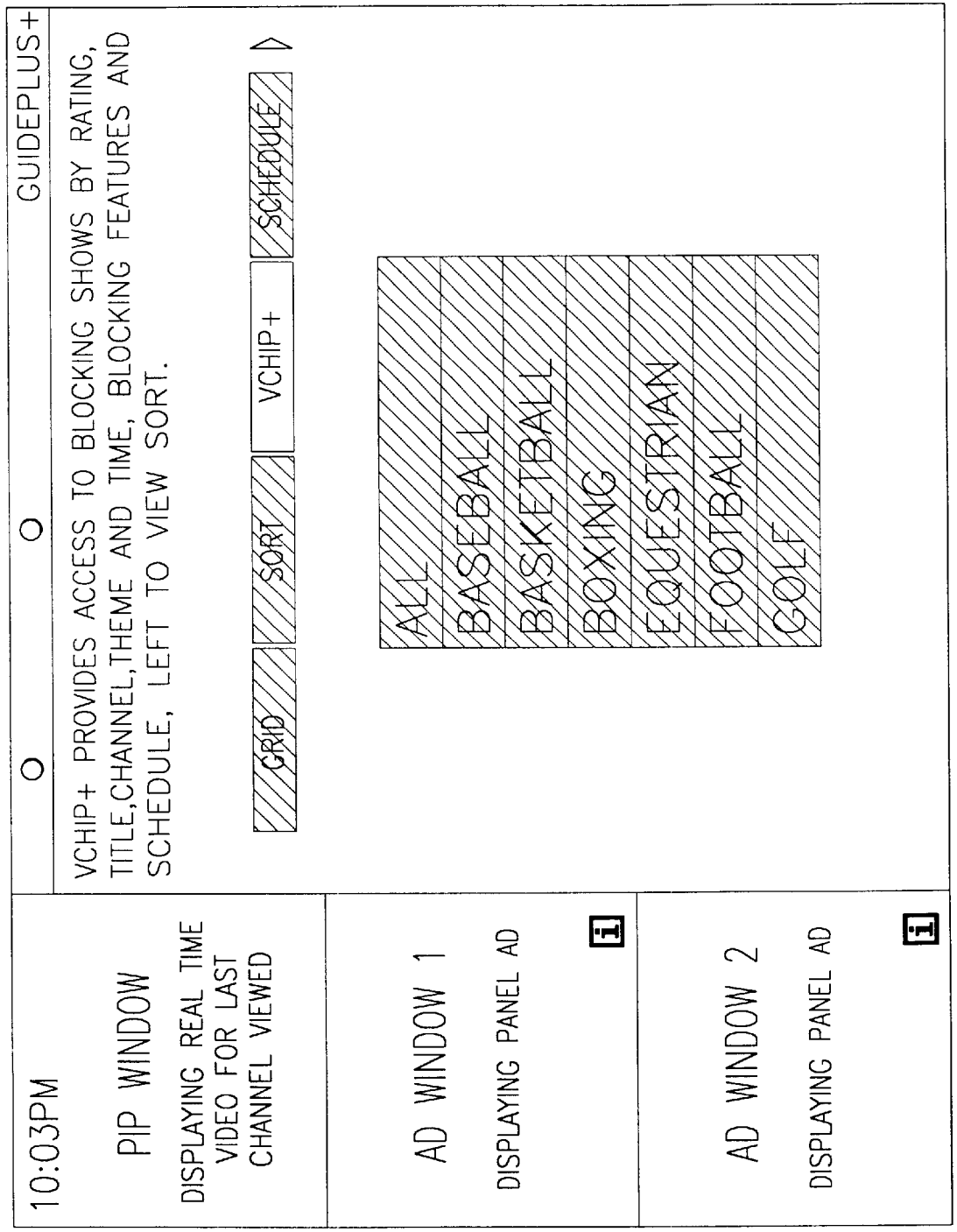
FIG. 34 is a television screen displaying selection of TV Ratings for blocking.

FIG. 33 shows an example of a UI in each IPG for the VCHIP Plus+ functions. The VCHIP Plus+ Menu screen provides access to all the VCHIP Plus+ screens. These screens can only be accessed in Master Password Mode. The user scrolls down off the menu bar to highlight the tile of the desired feature. FIG. 34 shows the selection of TV Ratings. The user presses the OK/Select key to enter the screens related to the highlighted VCHIP Plus+ feature. Any user attempting to access these screens when not in Master Password mode is prompted to enter the Master Password. If not in Master Mode, preferably these menu tiles are dark and unaccessible. The VCHIP Plus+ screens are accessed from the Menu bar; the user highlights the "VCHIP Plus+" button on the menu bar, and then scrolls down to select from the menu of VCHIP Plus+ functions. Throughout the VCHIP Plus+ screens, an (blue) action button is used to unblock and a different (green) action button is used to block shows, times. channels, etc. When the highlighted tile is currently unblocked, the blue action button label is blank and the green action button is labeled "Block." When the highlighted tile is blocked, the blue action button is labeled "Unblock" and the green action button label is blank, except if the highlighted tile is a show title. If a blocked show title tile is highlighted, the green action button is labeled "Schedule," providing access to the Schedule screen to modify the blocking frequency from the default of once to daily or weekly.

Similar to the watch and record features, a blocked show may be set to be blocked once, daily or weekly. This is accomplished by placing any individual show (this does not apply to all shows set to be blocked by channel, time or rating) that is set to be blocked into the Schedule queue. These blocked shows are mixed in with the shows set to record or watch in chronological order. By entering the Schedule, either by pressing the green action button while highlighting a blocked show in the VCHIP Plus+ or the GUIDE Plus+ screens or from the Schedule button on the menu bar, the user may modify the frequency of the block in the same way he/she may do so for shows set to record or watch, by pressing an action button labeled "Change." This cycles through the frequency choices. Modifying the frequency can only be done while the IPG is in Master Mode.

Scheduled events (shows scheduled to record, watch or blocked) for each IPG can be stored in a single non-volatile memory such as an EEPROM (not shown) within the single set-top box. Thus, if a power outage occurs, the Scheduled events are saved.

Master Password

In one embodiment of the present invention, a 4 digit numeric Master Password scheme is used to enable the establishment of a User Profile and provide unlimited (unprotected) access to the guide screens and shows once a Master Password is established. Only one Master Password can be established. It is established either during initial setup or later by entering the Password screen from the guide menu (see FIG. 33) or the TV mode. Once a Master Password is established, the Master Password must be entered to execute blocking or unblocking. Preferably, the Master Password need also be entered to access the Setup, Editor, VCHIP Plus+ screens, and resolve any conflicts between multiple IPGs. Once entered, the TV is in Master Password (unprotected) mode until the TV is turned off, the user exits VCHIP Plus+ mode, or a certain time delay, which starts from the time when the user correctly enters the password, has expired.

A user in the master mode can also set password priorities for other users. For example, a second user may have a password with higher priority than a third user. The second user with a higher priority password than the third user may resolve some of the conflicts with the third user in the second user favor and override some of the options capabilities of the third user.

A UI allows the users (parents) to pick their own passwords, and to disable the lockout when the passwords are lost. The functions of this UI include, but not limited to, the following:

(1) Fixed Overriding Password—This is hardwired in the equipment, and can always be used in case the user-defined password is lost.
(2) Repeating entry X times establishes new password—If the password is lost, the new password can be made by repeatedly entering the same password X number of times, and at the end of the process informing the user that the new password has been established.
(3) Power interruption after certain length of time allows new password to be entered—This allows the parent to "pull the plug" of the equipment and regain control after the password has been lost.
(4) Password review/re-entry through special service mode—By restricting that only the parents can access the special service mode, the password can be viewed safely in this way.

The above approaches of password handling can be further enhanced by recording the last time that the password was used or changed.

Figure 35:
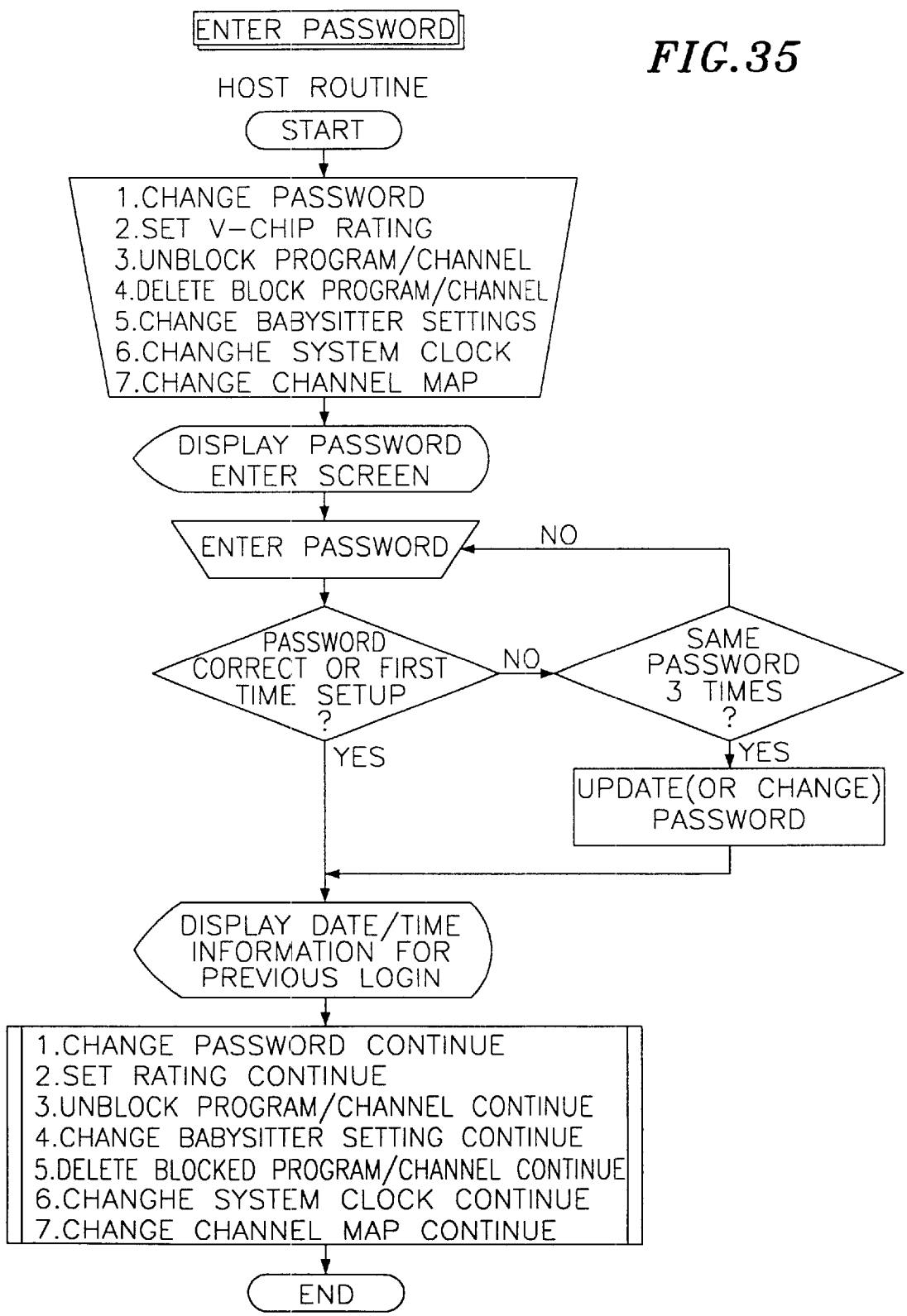
FIG. 35 is a flow chart of a master password operation.

FIG. 35 is a flow chart of the master password operation. Obviously not all operations would require a password. As shown in block 391, the following operations have password protection: changing the password, changing the V-Chip ratings, deleting a "blocked" program or deleting a "blocked" channel, changing the "Babysitter" function, unblocking a program or a channel within the "Babysitter" function, changing the clock (this is because a different clock causes VCHIP Plus+ to block a different program), and changing the channel map (this is because a different channel map causes VCHIP Plus+ to block a different channel).

A Master password user can establish specific viewing (blocking) parameters for each User Profile, establish specific feature use limits (disable Recording or Watch) for each User Profile, modify the Master password, or enter all screens for all IPGs and view, record or schedule to watch all shows. But, it is not necessary to input the Master Password to access unrestricted shows, channels, time slots, features and guide screens. Whenever access to a blocked show (tuning to it in TV mode or pressing OK or Guide keys from the Guide) or a restricted screen (scrolling into or pressing OK from menu bar) or feature (recording via action buttons, any enabled buttons on the remote—likely the record button—and via the VCRPlus+ key) of the guide is attempted, a dialog box appears on screen requesting the password.

If the password is correctly input, access is granted. If the password is incorrectly input, an error screen is displayed. Once the password is correctly input, access to all shows and areas of the guide is enabled until the TV is turned off, the user exits VCHIP Plus+ mode, or a certain time delay, which starts from the time when the user correctly eaters the password, has expired. Additionally, once the password is correctly entered, it can be changed by the user as shown in block 396. However, repeating the entry of a consistently incorrect password for a certain number of times can establish a new password. The new password is established by repeatedly entering the same incorrect password a certain number of times, and at the end of the process confirming the newly established password (block 395). The date and time of the last time that the password was used is recorded and, as shown in block 397, that date and time for the previous log in is then displayed.

Once a Master Password is created, restrictions on access to certain IPGs or certain IPG screens is automatically established as modifications to these IPG or IPG screens may defeat blocking effectiveness. Only the Master may establish blocks for the rest of the users or all the IPGs. Access-blocking may be established on: individual IPGs, individual users, individual TV sets, individual shows; channels; themes (entire themes such as Movies, Sports, Children's or sub-themes such as Adventure, Drama, Baseball, Basketball, etc.); TV Parental guideline or MPAA rating (including un-rated shows); time slot or day; and/or access to the Recording and Watch features.

For example, to block television programs based on individual IPGS, a user with the master password may block all "R" and "PG-13" ratings for a first IPG corresponding to a first TV receiver and block only "R" ratings for a second IPG corresponding to a second TV receiver. Therefore, regardless of what user uses the respective IPG, the blocked programs will not be enabled for viewing. To block television programs based on individual users, a user with the master password may block certain programs for a first user and block different programs for a second user. Thus, regardless of what TV receiver the first and second users use, they will be prevented from viewing the blocked programs respectively. Furthermore, a user with a master password can customize or change the customization of other IPGs or user profiles.

The user controls the multiple IPG system from a remote control. The remote control has special keys, such as GUIDE and INFO, that display IPG screens and pop-ups and that perform IPG functions.

Grid Guide

The Grid Guide displays a grid of program information for given times. The Channel Guide displays a grid of program information for given channels. The Theme Guide displays a column of program information for a category and subcategory. The Guides can display multiple days of information.

Channel Guide

Figure 2:
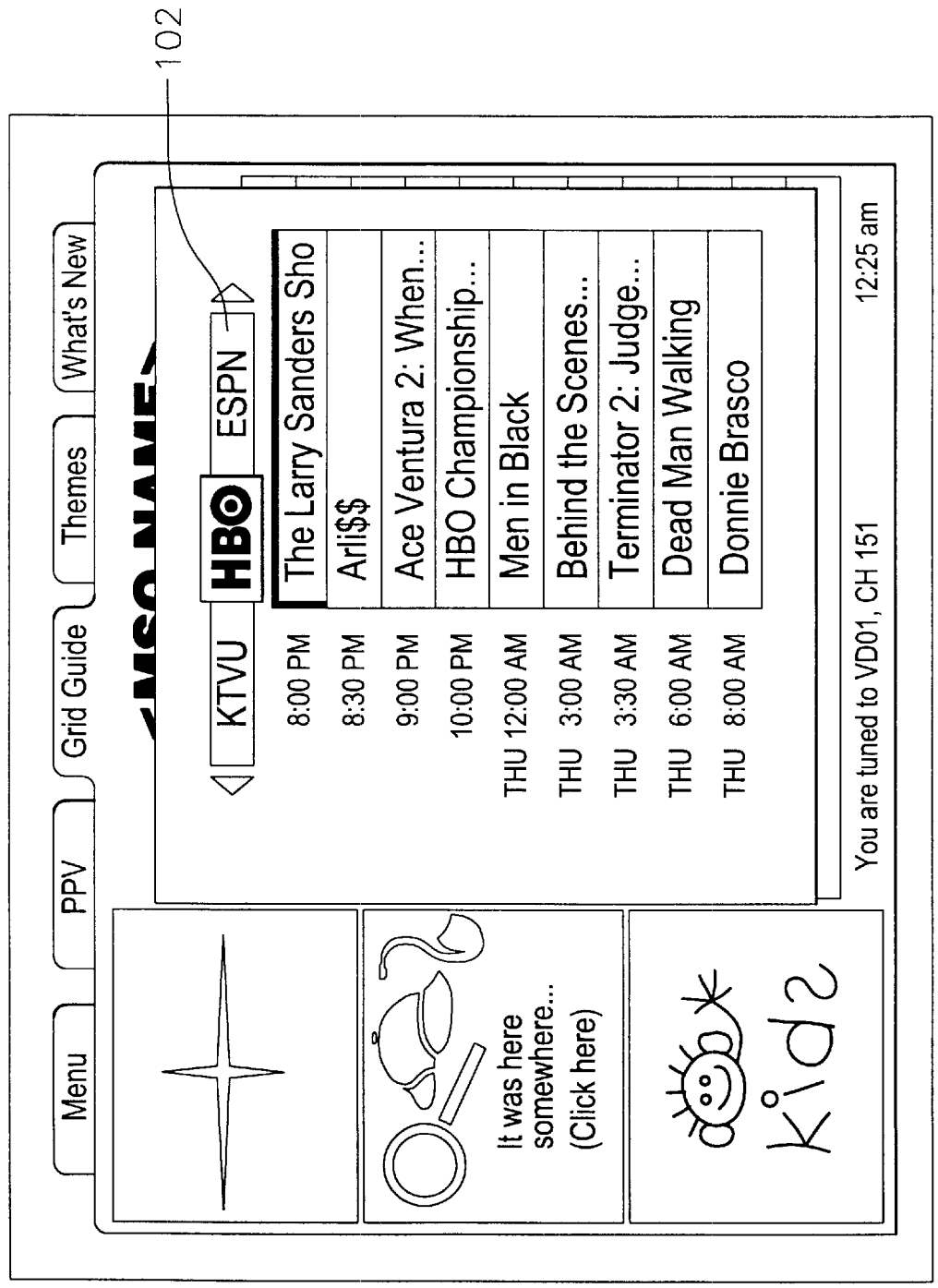
FIG. 2 is a Channel Guide featuring a "carousel" at the top that includes a graphical icon for the channel being displayed, and text icons for adjoining channels in the user's customized lineup.

FIG. 2 shows a Channel Guide. The Channel Guide displays program information in chronological order for one channel at a time. The Channel Guide displays information for the channel that was highlighted in the Grid Guide. To see program lineups for the other channels, the user presses CH↑,CH↓, ←, or →.

The Channel Guide features a "carousel" 102 at the top which shows the graphical icon for the channel being displayed, and text icons for the adjoining channels in the user's customized lineup. Pressing RIGHT or LEFT would cause the carousel to rotate to the adjoining channel.

The operator may not wish to include the Channel Guide in the feature set of the IPG. The Channel Guide is an optional feature. Depending on the amount of memory available and the specification of the operator, the number of days displayed in the guide and the amount of program descriptions can vary.

Channel Icons

Figure 3:
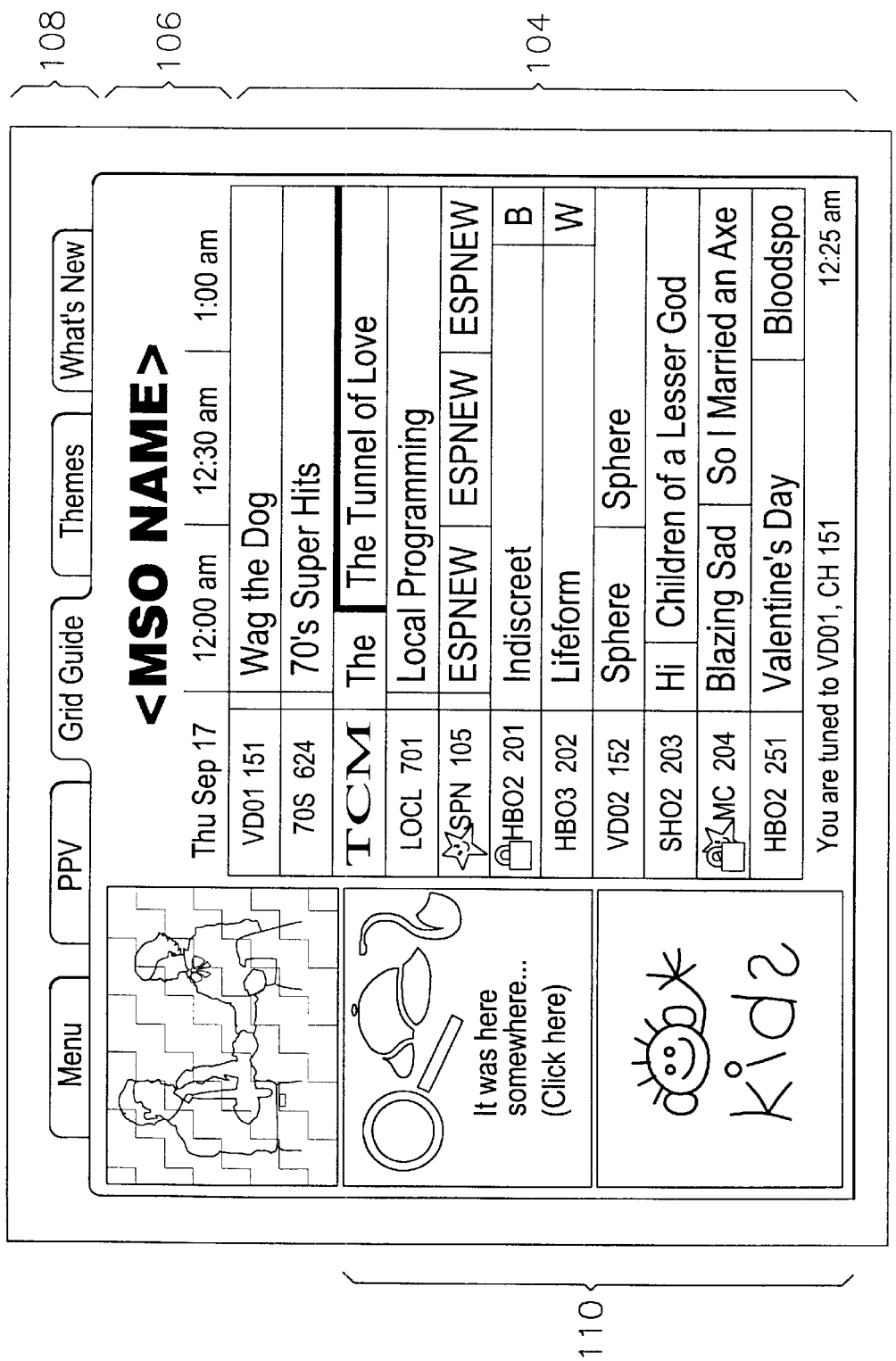
FIG. 3 is a Grid Guide format and illustrates common components of guides.

FIG. 3 shows the Grid Guide format and illustrates common components of the guides. Guides in general include a listing area 104 in the middle in which program information is displayed, a title area 106 above the listing area, and menu tabs 108 at the top, which may or may not be accessible using the navigation keys (depending on the type of guide being displayed). The Grid Guide in particular includes these elements, with a Network Operator name displayed in the title area, and additional elements such as the channel banner at the bottom and the interactive promotions 110 at the lefthand side. The Network Operator may be a Multi-System Operator (MSO). Any cable company that owns more than one franchise is an MSO. For example, Cox Cable has multiple franchises, such as Cox/San Diego, Cox/Orange County, Cox/Phoenix, etc.

The picture-in-Picture (PIP) is at the upper left-hand corner in those devices that support PIP. In devices that do not support PIP, this area can be used to display further graphical branding 112, as shown in FIG. 4.

The channel banner in the Grid Guide is displayed at the bottom of the screen. It shows the current time and channel information for the currently-tuned channel. Channel banners in general display information for the currently-tuned channel; the only exception is the channel banner that displays inside the browsing pop-up, which contains channel information for the program in the pop-up.

The channel banner is comprised of channel information, channel number, and current time. In the preferred embodiment, the channel information contains a string of up to four characters giving the call letters and affiliation of channels. In the preferred embodiment, the channel number contains a string of up to three characters that identifies the channel number to which the IPG device is tuned. In the preferred embodiment, the current time shows the current time, displaying up to two numeric characters for the hour, followed by a colon, followed by two more numeric characters for the minute, followed by either an AM for a PM. All references to time use a 12-hour clock.

Figure 4:
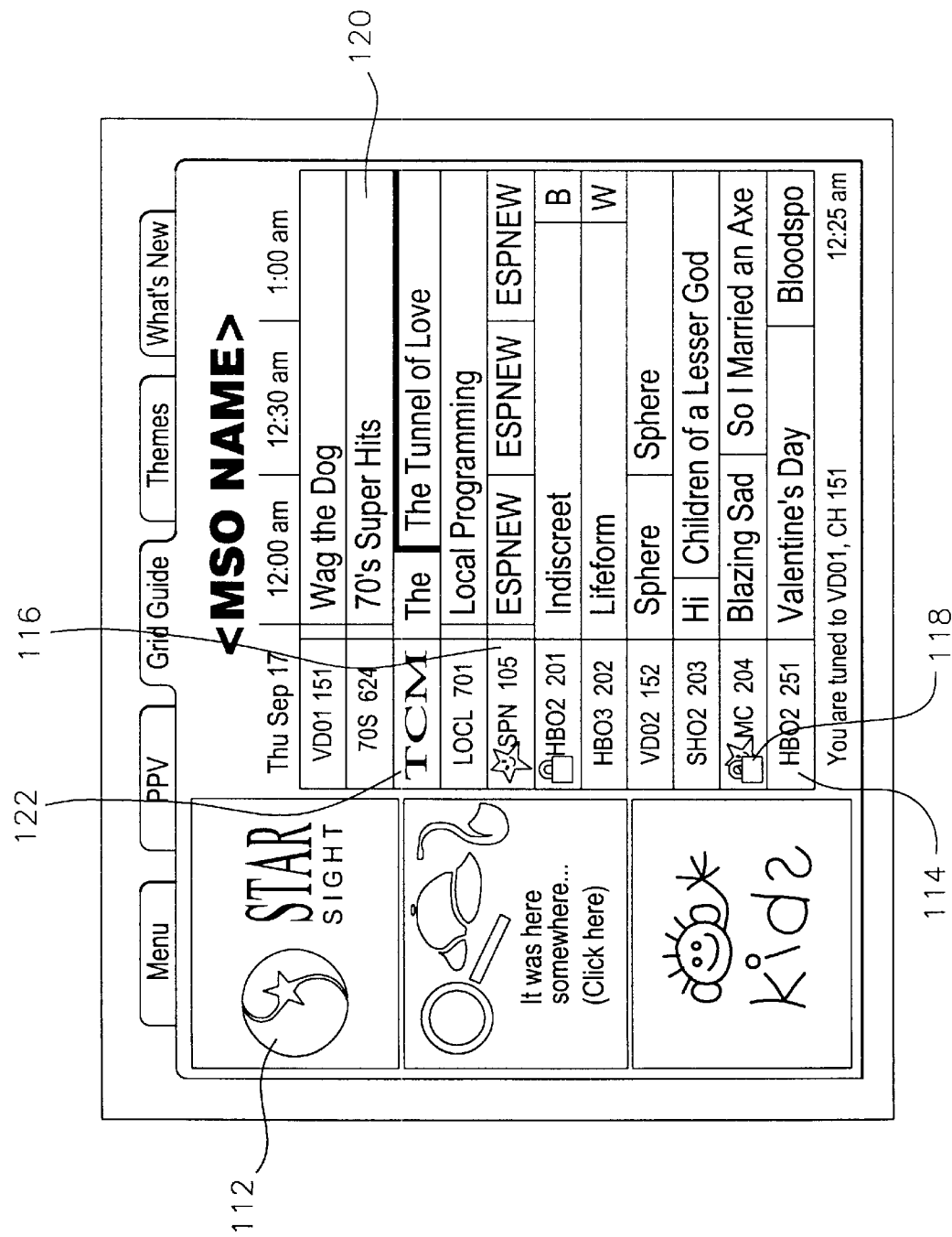
FIG. 4 is an IPG for displaying further graphical branding.

FIG. 4 shows 11 channel icons listed on the screen. Channel icons 114 are the boxes that contain the channel number or an abbreviation of the channel name. Channel icons display in the left column of the listing area of the Grid Guide and in the listing area of the Change Channel Order, Select Channels, Favorite Channels, and Lock by Channels screens. Channel icons are up to seven characters wide and contain a channel number or name from one to four characters and a tune channel number. To the right of the channel icons are the programs available for those channels for the current time period. The number of half-hours and channels that can be displayed in the Grid Guide can be configured, depending on the size of the font.

In one embodiment, if the channel has a Favorite designation, the Grid Guide shows a yellow star 116 to the left of the channel icon. If the channel is a locked channel, the Grid Guide shows a lock symbol 117 next to the channel icon. If a channel is both locked and a Favorite, the lock icon overlays the Favorite icon 118, but both are visible.

The cursor is the yellow highlight 120 occupying a cell of the Grid Guide, a row in the Theme Guide, a field in the setup screens, etc. By moving the cursor, the user moves from program to program in the guides. In addition, the user moves the cursor to make selections, such as category and subcategory. The user moves the cursor with the remote control navigation keys: ↑, ↓, ←, →, DAY ←, DAY →, CHAN ↑, CHAN ↓, PAGE ↑, and PAGE ↓.

When the cursor is on a channel or channel icon, a larger icon 122 will overlay the default icon and a little of the icons above and below it. In the preferred embodiment, the larger icon can display the channel logo (If the graphical logo is in memory), or the same information in the channel icon, but in a larger font.

The yellow star symbol indicates channels selected as Favorite. The dark gray lock symbol indicates channels under parental control. The red unlock symbol indicates channels that are unlocked. The green purchase symbol indicates programs that have been purchased.

Using the Guide

From any guide, users can do the following: View the program information, request more information for a program title or channel (display Information pop-up), tune to a channel, purchase an IPPV program, unlock or relock the IPG, and select a channel as a Favorite.

While viewing any of the guides, the user can return to the tuned channel, tune to another channel, or switch to another guide. To close a guide and return to the currently tuned channel, the user presses EXIT. To tune to a program on another channel and close the guide, the user places the cursor on the desired program/channel and presses SELECT. This brings up the Info pop-up, on which the user can move the cursor to the "TUNE" button. The user presses SELECT again, and the system tunes the IPG device to the new channel for the program and displays a Grazing Title pop-up.

To tune directly to another channel, the user presses numbers on the remote control number pad to display the number pad pop-up. When the pop-up times out (in two seconds) or the user presses SELECT, the IPG closes the guide and tunes to the new channel. To close the current guide and go to another guide or screen, the user presses the appropriate remote control key. For example, the user can press GUIDE while in the Theme Guide to see the Grid Guide.

In most cases, when the user changes from one guide to another, the cursor remembers the time and channel it was on so that it can go to the same place in the new guide; therefore, cursor time remains the same. However, when the user switches from the Grid Guide to the Theme Guide, the cursor goes to the first show that fits into the category the user selected. The start time of this show becomes cursor time.

If the user does not press a remote control key for two minutes, the guides time out automatically.

Figure 5:
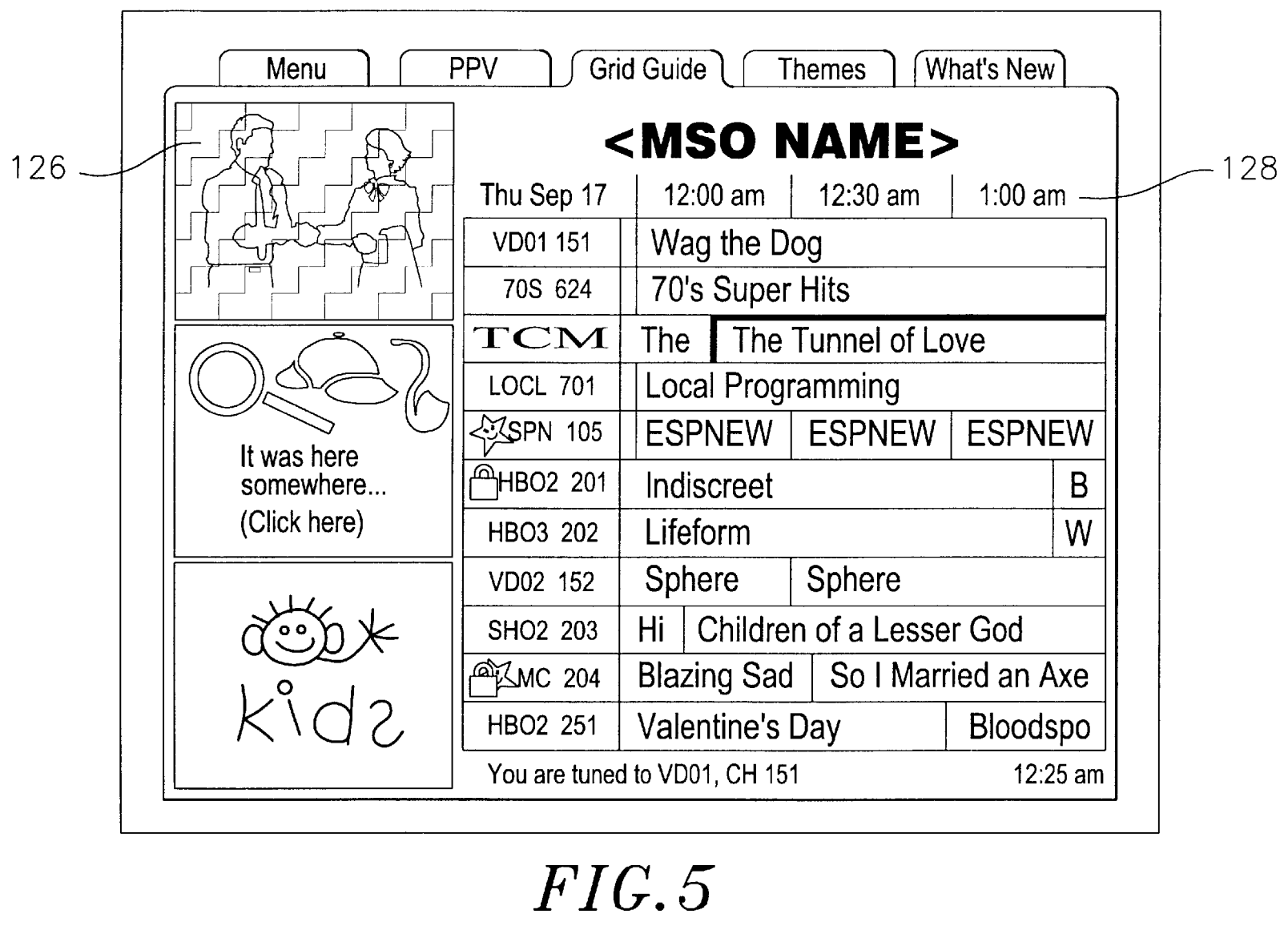

To display the Grid Guide while viewing TV or while viewing any IPG screen other than the Grid Guide, the user presses GUIDE. If the user is already displaying the Grid Guide and presses GUIDE, nothing happens. When the user presses GUIDE while viewing TV, the IPG displays the system page which contains the currently tuned channel and places the cursor on the current time and currently tuned channel 124, as shown in FIG. 5. If the user is watching a channel not in the IPG channel lineup, the cursor goes to the first channel in the IPG channel lineup. The user can set up a customized channel order to be used by the IPG.

The cursor can be on any page of the guide and on any row of the page. The channel that is currently tuned and the IPG channel lineup determine the location of the cursor. The location of the cursor depends on which channel the TV is currently tuned. For example, if the user tunes the TV to channel two before pressing GUIDE, the cursor may be at the top of the first page of the Grid guide. If the user tunes the TV to channel 36, the cursor may be in the middle of the last page of the Grid Guide.

If the user has a preferred order for switching channels and viewing the program information in the guides, the IPG can be configured to allow the user to reorder the TV channels for use with IPG. The new customized order takes precedence over the default order and determines on which page the cursor appears.

The left corner of the title banner displays the PIP 126, which shows the currently tuned channel, so that the user can use the guide during a commercial break and see when the commercial has ended. In devices that do not support a PIP, the area can be used to display a graphical logo.

Partial Rows and Icons

The program times 128 for the guide are in the title banner below the branding area. A few pixels of visible rows of the Grid Guide appear at the right-hand edge of the listing area to indicate that the user can move the guide ahead additional days. If the user has moved the guide into the future, a few pixels of visible rows of the Grid Guide appear on the left edge of the listing area to indicate that the user can navigate the guide back to current time. At the top and bottom of the listing area, a few pixels of visible rows appear to indicate to the user that scrolling up or down past the top or bottom row will display information for a different page.

In an embodiment of the invention, an icon is displayed next to items in a menu screen list. In addition, a partial icon is displayed next to the first item on a screen display list to indicate that the list continues beyond the screen display and that there is an item which comes before the first item on the screen display. A partial icon is displayed next to the last item on a screen display list to indicate that the list continues beyond the screen display and that there is an item which comes after the last item on the screen display. For a list that is arranged on the screen from top to bottom, a partial icon displayed next to the first item on the screen display indicates that the list continues beyond the upper portion of the screen display and a partial icon displayed next to the last item on a screen display list indicates that the list continues beyond the lower portion of the screen display. In another embodiment of the invention, the icon may be user-defined. In such an embodiment, the user can invoke a palette of symbols from which the user can choose a symbol to designate as the icon for screen display list items. The user may also create an icon using drawing software and designate the drawn icon as the icon for the screen display list item. Also, an icon for a screen display item may be designated from a file. The preferred embodiment of the invention includes displaying circles or bullets next to items in a menu screen list. In addition, a partial circle or bullet is displayed next to the first or last item on a screen display list to indicate that the list continues beyond the screen display.

The Grid Guide has a screen time associated with it; screen time is not associated with the Theme Guide. When the user first comes to the Grid Guide, screen time is the time of the left-most column in the listing area.

FIG. 6 shows when the beginning of a show appears to extend beyond the left edge of the guide. A show having a vertical bar at its left-hand side signals to the user that the show began at the time displayed. However, if the beginning of a show appears to extend beyond the left edge of the guide, this signals to the user that this program actually began at an earlier time slot than is currently displayed on the screen.

Show titles on a non-selected channel are written in white, to be clearly visible against dark background colors. Selected show titles are written in black, to be clearly visible against the cursor.

The Grid Guide is colored by the theme. The Grid Guide displays different colors for several types of programming, based on theme attributes. In an exemplary embodiment, the default color scheme uses purple, green, and blue for show titles. The show titles on the Grid Guide can be displayed in three theme colors:

Movies are displayed on a purple background; sports are displayed on a green background; and all other shows are displayed on a blue background. Interactive promotions may be any color in the IPG palette except bright yellow, which is reserved for the cursor.

A show title includes a moving Time Column. The moving Time Column graphically represents how much of the show is over. It is a column, because the shading is vertical. Its height is constant and its width expands from left to right. When the user displays a Grid Guide that includes the current half-hour, any portion of the show title that precedes the current minute is displayed in a darker variant of its Theme Color. For example, if the current time is 8:17 pm and the user is displaying a system page with a screen time of 8:00 pm, the moving Time Column will shade roughly half of the first half-hour of show titles, so that the background color for movies will be a darker red up until the current time, the background color for sports a darker green, and the background color for all other shows a darker blue. When the cursor is on a show that begins before current time, that portion of the cursor to the left of current time will also be shaded a darker shade of yellow.

Promotions

The IPG includes interactive promotions. The lefthand side of the display may have a plurality of interactive promotions. The interactive promotions may change over time. In an exemplary embodiment, the promotional area at the left-hand side of the screen, beneath the PIP, displays two interactive promotions, which can feature a combination of text and bit mapped content. When the cursor is on the earliest possible column of show titles and the user presses ←, the cursor 130 will move onto one of the two interactive promotions, as shown in FIG. 7. The user can move between the two promotions by pressing ↑ or ↓,. If the user presses ↑ while the cursor is on the upper promotion or ↓ while the cursor is on the lower promotion, the cursor will move to the "Grid Guide" menu tab. If the user presses → while the cursor is on either of the promotions, the cursor will move back to the show title from which the user moved to the promotions. Then, if the user presses ← again, the cursor will move to whichever of the two promotions the user had last selected.

Figure 8:
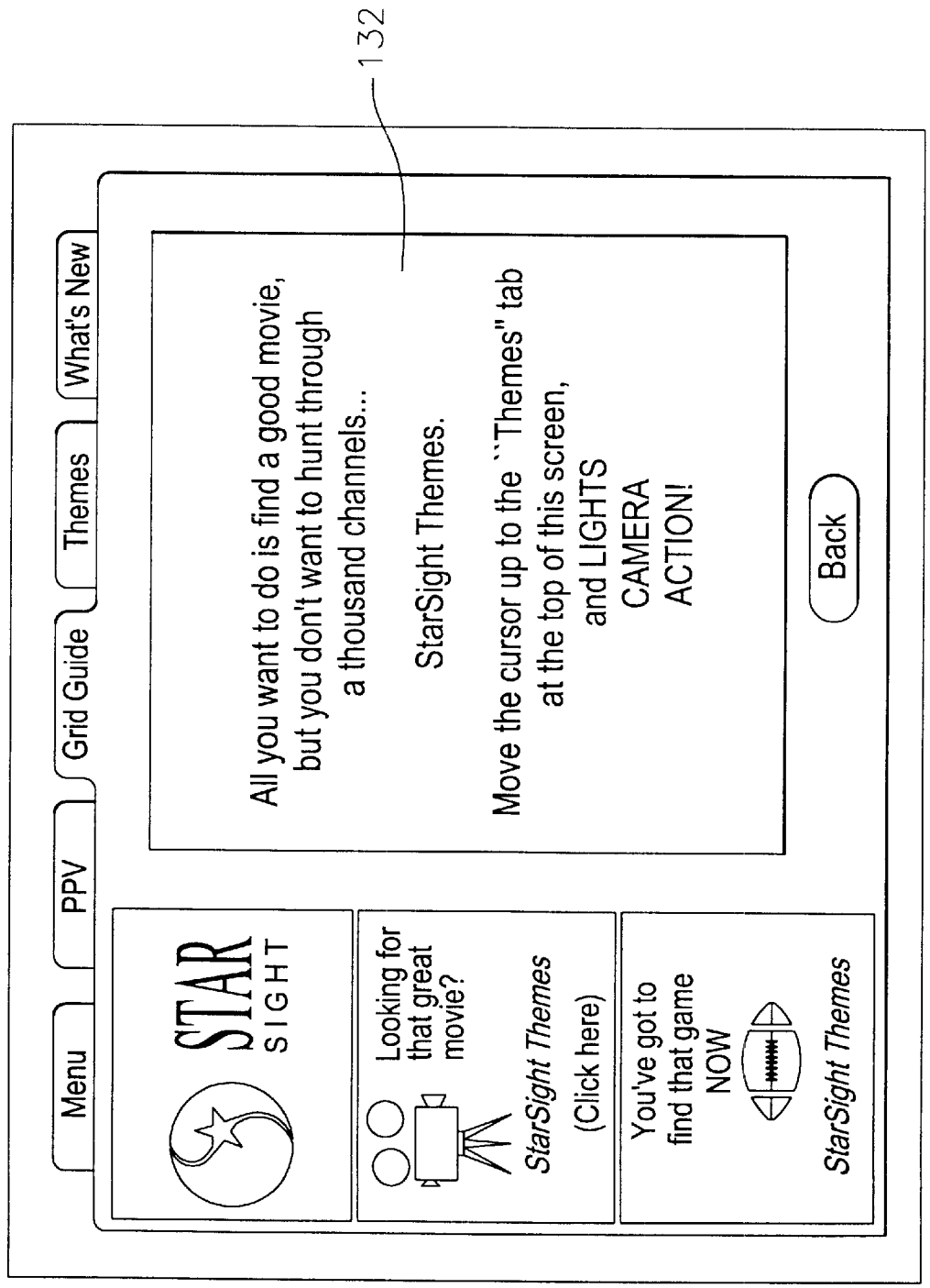
FIG. 8 is an interactive billboard.

In an exemplary embodiment, a user can provide input in response to the interactive promotion and cause an action. In a preferred embodiment, if the user presses SELECT while the cursor is on one of the promotions, an interactive billboard 132 will be displayed for the promotion, as shown in FIG. 8. The interactive billboard includes text and color information that is sent to the IPG as part of the database. The interactive billboard accompanies the interactive promotion and is a feature of the promotion. The promotion is very small and only allows the advertiser to display a small amount of text; the billboard can be multiple pages of text. In essence, to analogize to books, the promotion is the cover of the book and the billboard is the complete book.

The interactive billboard also includes buttons, which when selected cause an action. In an exemplary embodiment, there will be three buttons at the bottom of the billboard: "BACK," "AUTOTUNE," and "RECORD." SELECT is a key on the remote control. Pressing the SELECT key while a cursor is on one of the three buttons effects the action of that button. The phrase "Selecting 'AUTOTUNE' . . . " is to be read as a compression of "Highlighting 'AUTOTUNE' and pressing SELECT." Remote control keys and on-screen buttons are differentiated by using quotation marks around the latter.

Pressing BACK on the remote control will redisplay the prior screen. Selecting "AUTOTUNE" will tune to the channel of the program indicated in the promotion. Selecting "RECORD" will setup the program indicated in the promotion for recording. Selecting "BACK" will remove the billboard from the screen and return the cursor to the interactive promotion.

The interactive promotions may be configured to be different on different pages of the guide, and promotions in the PPV Guide may be different from those displayed in the Grid Guide. The promotions on any given page may also be combined into a single, rectangular promotion.

Theme Guide

The Theme Guide enables users to view a list of programs for a particular category and subcategory. In one embodiment of the invention, there are three Theme screens: Themes, Theme Subcategories, and Theme Guide. The Themes screen displays a list of categories from which the user can select one. The Theme Subcategories screen displays a list of subcategories for the selected category. The user can select one for viewing program information. The Theme Guide screen displays programs for a category and subcategory.

The user selects a category on the Themes screen and then selects a subcategory on the Theme Subcategories screen. The system then displays the programs that fit the subcategory on the Theme Guide screen.

Figure 9:
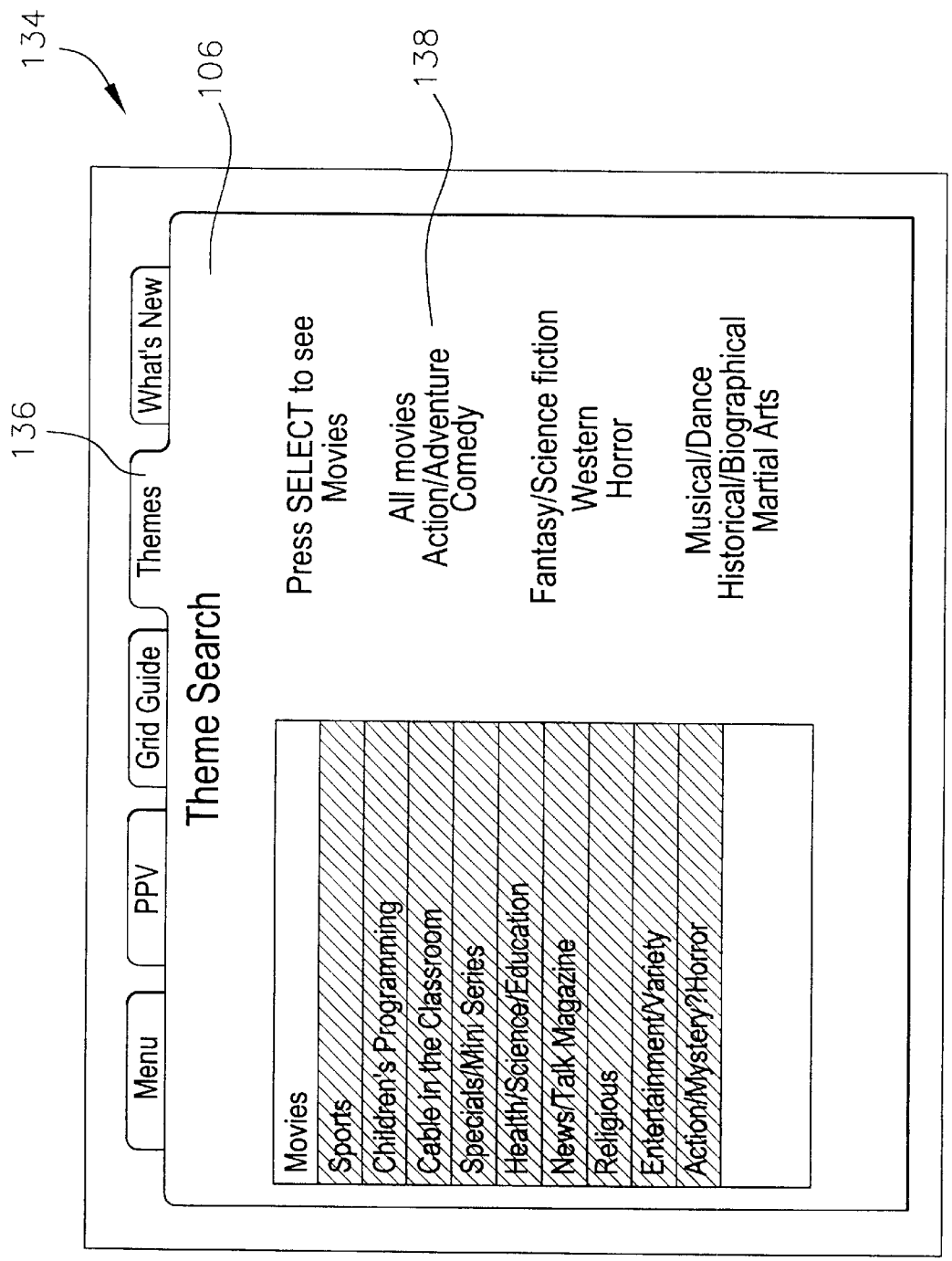
FIG. 9 is a Themes screen.

In one embodiment of the invention, the Themes screen 134 can display up to 12 theme categories per page from which the user can select one, as shown in FIG. 9. The operator can choose theme categories and subcategories at the headend PC.

The user displays the IPG Themes screen in one of two ways: (1) by pressing either GUIDE or MENU and then moving the cursor up to the menu tabs, scrolling to the "Themes" tab 136, and then pressing SELECT; and (2) by pressing MENU, scrolling down to the "Theme Search" option, and pressing SELECT.

The menu tabs at the top of the screen are displayed at the top of the Themes screen. The title banner 106 at the top of the screen says Theme Search. In one embodiment of the invention, the listing area in the middle of the screen contains up to 12 categories listed in a column down the screen. When the user first displays the Themes screen, the cursor defaults to the first category. If the user returns to the Themes screen from Theme Subcategories screen, the cursor goes to the last selected category.

The Theme subcategories 138 that pertain to the selected Theme are displayed on the right of the screen. As the user moves the cursor from category to category, the subcategories at the right change, so that the user can anticipate what will happen if the Theme is selected. If there are more subcategories than can fit on the page, the word "more . . . " is displayed at the bottom of the column, so that the user looking for a particular subcategory isn't mislead into thinking that all the subcategories are being displayed.

Figure 10:
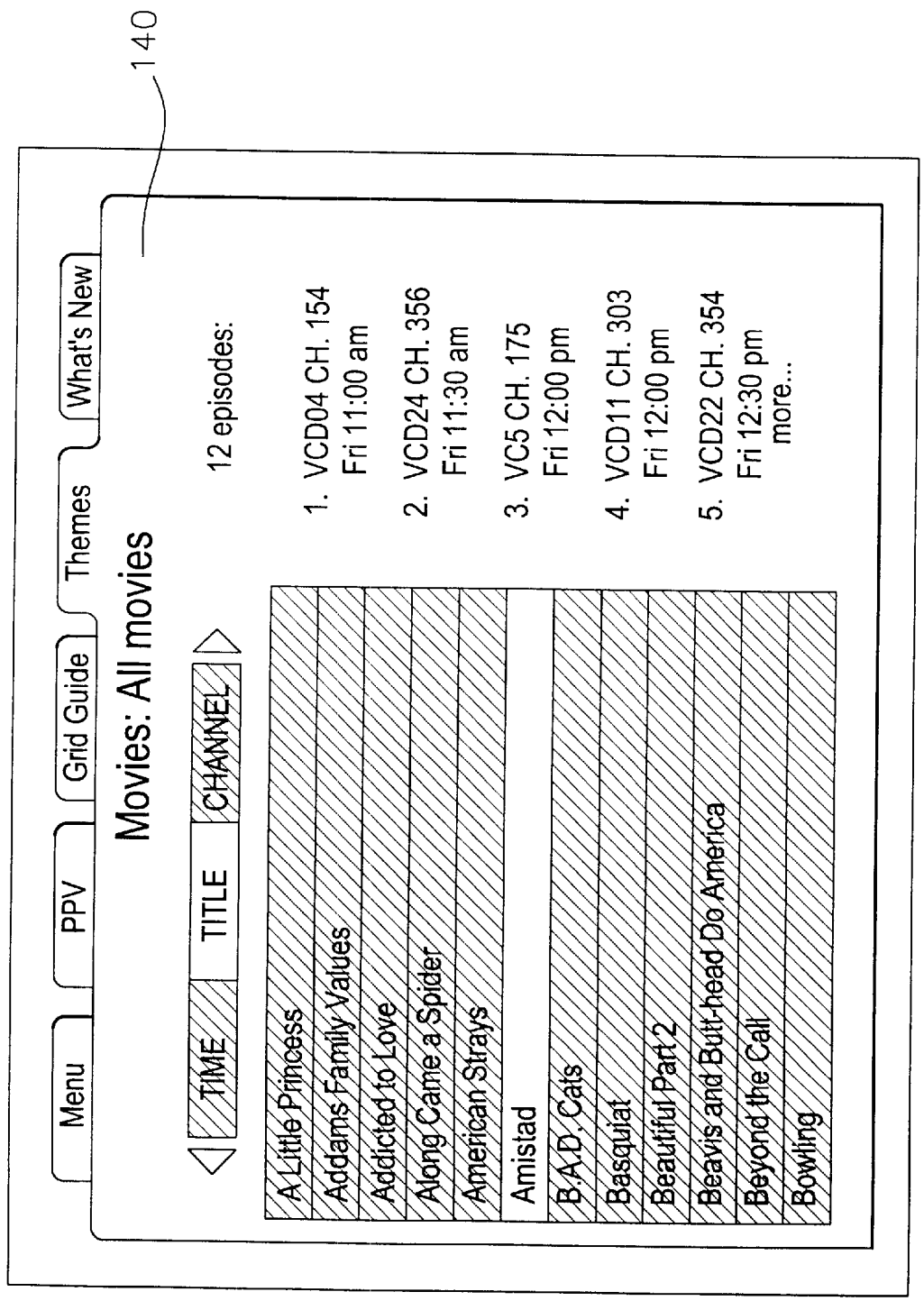
FIG. 10 is a Theme Guide with multiple episodes.

FIG. 10 shows the Theme Guide with multiple episodes 140. In FIG. 10, the theme is movies. The highlighted show is "Amistad." If the highlighted show has multiple episodes, they will be displayed on the right side of the Theme Guide.

Pressing ↓ moves the cursor down one category. If the user is already at the bottom of the category list and presses ↓, the cursor doesn't respond if there is only one page of categories. If there are more pages, then if the cursor is on the bottom entry of the page and the user presses ↓, the IPG displays the next page of categories, and the cursor goes to the first entry of the next page; if the user is already at the bottom of the list and presses ↓, the system displays the BOTTOM message at the bottom of the list.

Pressing ↑ moves the cursor up one category. If the user is already at the top of the list and presses ↑, the cursor moves to the "Themes" menu tab. If there are more pages, then if the cursor is on the top entry of the page and the user presses ↑, the IPG displays the previous page of categories, and the cursor goes to the last entry of the previous page; if the user is already at the top of the list and presses ↑, the cursor moves to the "Themes" menu tab.

In one embodiment of the invention, there can be up to 12 categories on one page. If it happens that there are more theme categories available, the user can press PAGE ↓ and PAGE ↑ to navigate the Themes pages.

Figure 11:
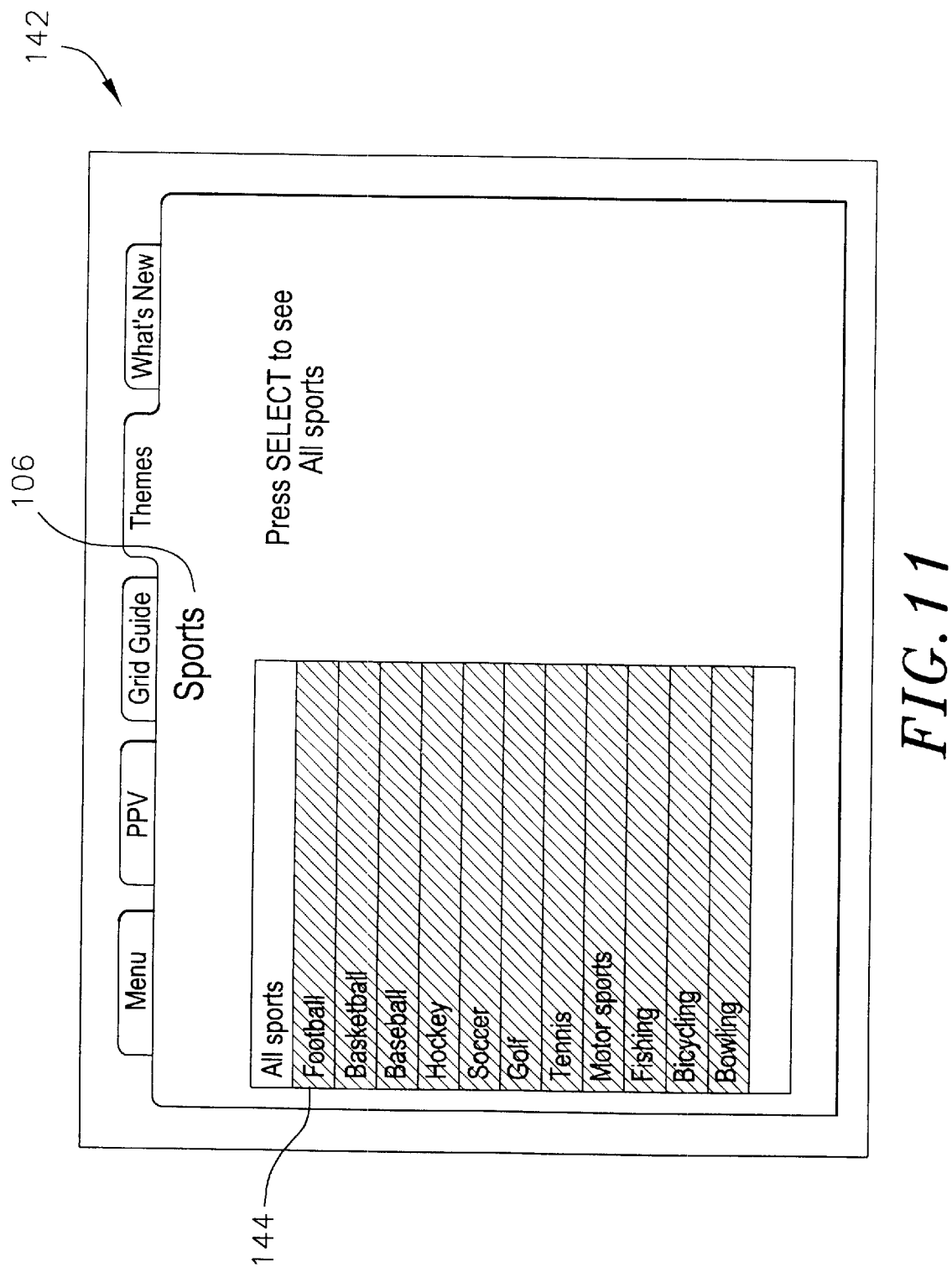
FIG. 11 is a Theme sub-categories.

To select a Theme category, the user moves the cursor with the cursor navigation keys to a category and then presses SELECT. Once the user selects a category, the system remembers it until the user selects a new category or until the user leaves Themes. If there are subcategories for the category, the system displays them on the Theme Subcategories screen 142 as shown in FIG. 11.

The Theme Subcategories screen displays subcategories 144 from which the user can select. Some categories have only a few subcategories, and others have multiple pages of subcategories. If there are no subcategories associated with the selected Theme, the system does not display the Theme Subcategories screen. Instead. the IPG displays the Theme Guide for the category when the user selects a theme. Pressing SELECT on the Themes screen displays the Theme Subcategories screen with a list of associated subcategories.

The title banner 106 at the top of the screen contains the user's selected category. The listing area in the middle of the screen shows the subcategories for the category. In one embodiment of the invention, the Theme Subcategories screen can display up to 11 categories on one page. Typically there are not more than 11 subcategories for each category. When the user first displays this screen, the cursor defaults to the first subcategory; if the user returns to this screen from the Theme Guide, the cursor displays on the last selected subcategory. If there are more than 11 subcategories, a small amount of a twelfth row is displayed at the bottom of the listing area, as a cue to the user that there is more information on the next page. If there are 11 or fewer subcategories, this area is grayed out, as a cue to the user that all of the available information is already displayed.

The user navigates the Theme Subcategories screen similarly to the Themes screen. Pressing ↓, moves the cursor down one subcategory. If the user is already at the bottom of the subcategory list and presses ↓, the cursor doesn't respond if there is only one page of subcategories. If there are more pages. then if the cursor is on the bottom entry of the page and the user presses ↓, the IPG displays the next page of subcategories, and the cursor goes to the first entry of the next page. If the user is already at the bottom of a multiple-page list and presses ↓, the system displays the BOTTOM message at the bottom of the list. Pressing ↑ moves the cursor up one subcategory. If the user is already at the top of the list and presses ↑, the cursor doesn't respond if there is only one page of subcategories. If there are more pages, then if the cursor is on the top entry of the page and the user presses ↑, the IPG displays the previous page of subcategories, and the cursor goes to the last entry of the previous page: if the user is already at the top of a multiple-page list and presses ↑, the system displays the TOP message at the top of the list.

In one embodiment of the invention, there are 11 subcategories on one page. If it happens that there are more theme subcategories, the user can press PAGE↓ and PAGE↑ to navigate the Theme Subcategories pages.

To select a subcategory, the user moves the cursor with the cursor navigation keys to a subcategory and presses SELECT. Once the user selects a subcategory, the cursor remembers the subcategory until the user selects a new category (on the Themes screen) or until the user leaves the Themes screens. The system searches the database for all the current and future programs that fit in the subcategory; if there are more programs than fit in the buffer, the system holds as many as it can and then enables the user to continue the search on the Theme Guide screen. If there are no programs for the subcategory, the Theme Guide is displayed with a single line, with "(no title)" displayed. The user can press SELECT or EXIT to return to the Themes Subcategories screen. If the system finds programs, it displays them on the Theme Guide screen.

The Theme Guide displays all the programs that fit a particular subcategory. A Theme Guide may have multiple pages of program listings. In one embodiment of the invention, the Theme Guide can display between one and seven days of program information depending on the amount of memory available and the specifications of the operator. The program listings can be sorted by time, alphabetically by title, and by channel.

Figure 12:
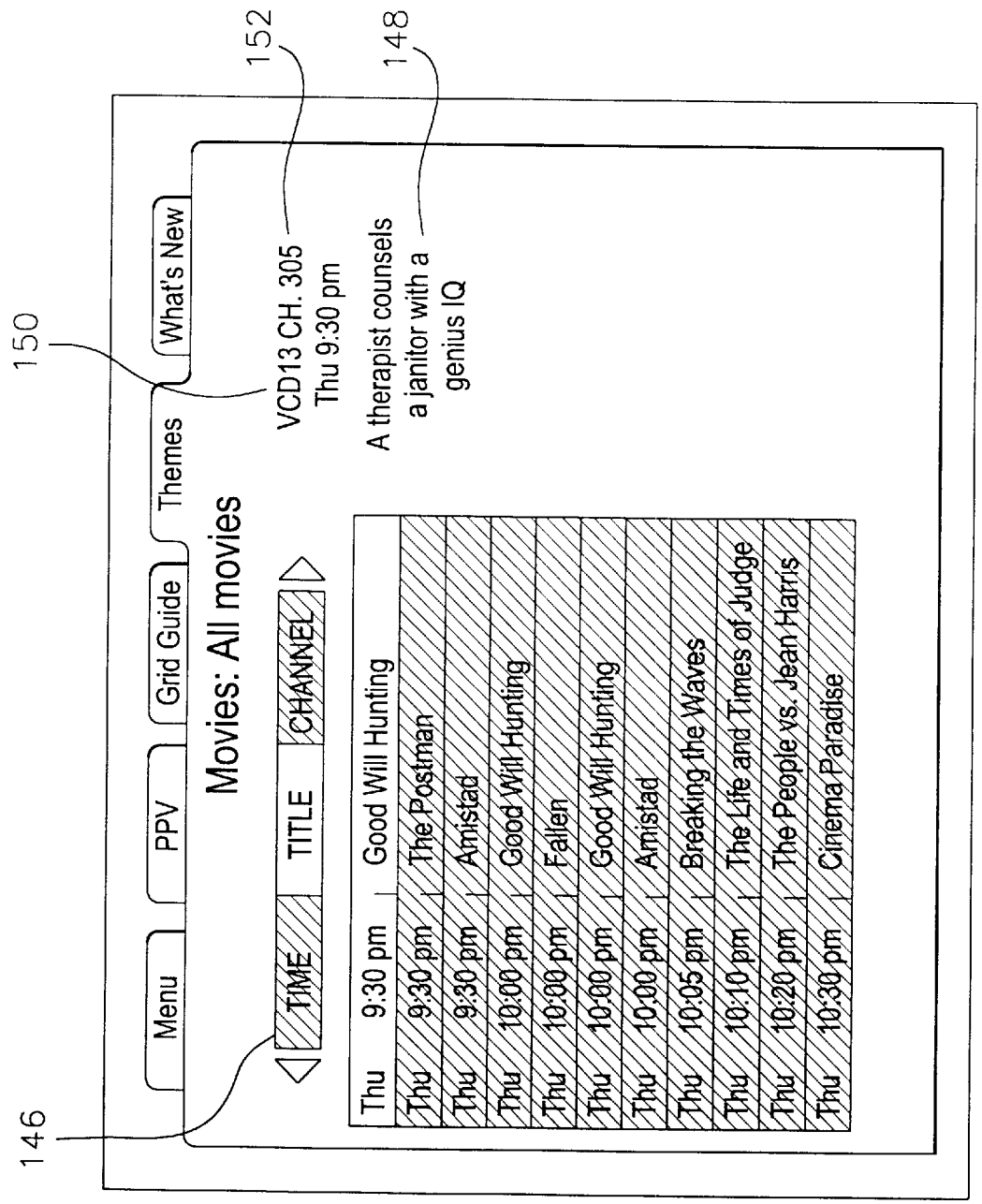
FIG. 12 is a Theme Guide sorted by time.

Pressing SELECT on the Theme Subcategories screen displays the Theme Guide screen with the programs that fit the subcategory, as shown in FIG. 12. The cursor displays on the Theme Guide screen once the search is complete. The Theme Guide displays the current and future programs that fit the subcategory. The cursor defaults to the first program in the Theme Guide. If more than one program starts at the same time, the system displays the programs in the user's customized channel order.

The title banner displays the selected subcategory. Below the title banner is the SORT BY row 146 that enables the user to sort program listings by time, alphabetically by title, and by channel. The listing area in the middle of the screen lists the programs that fit the subcategory. For each program, the system displays the following information:

If the listings are sorted by time, the title, start time, and start day are displayed.

If the listings are sorted by title, only the title is displayed.

If the listings are sorted by channel, the title, channel number, and channel name (preferably 4 characters, but it could be more or less characters) are displayed.

At the right of the screen, the description 148 for the selected title is displayed. At the top of the description, the channel name 150 and channel number 152 are displayed on one line, and the start day and time are displayed on the next line. Beneath these, the description is displayed. If the description is too long to be fully displayed, as much of the description as possible is displayed, followed by the "more . . . " tag.

Figure 13:
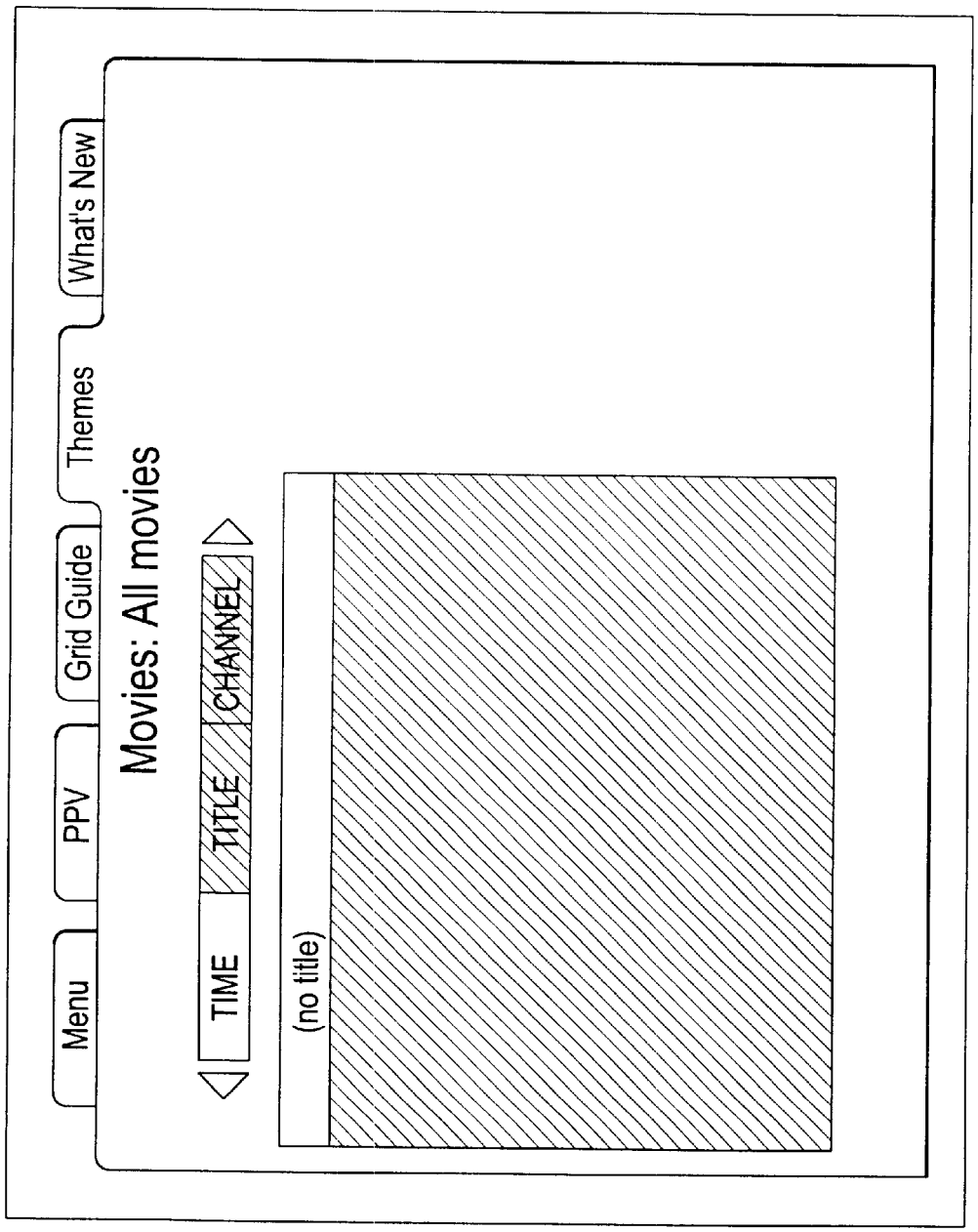
FIG. 13 is a Theme Guide when there are no titles available or the user's selected sub-category.

If the cursor is on the message, "Press SELECT for more titles," the description at the right displays information for the last program entry the cursor was on in the Theme Guide. If there are no titles available for the user's selected subcategory, the system displays the message (no title), as shown in FIG. 13. The user can then press EXIT to return to the subcategory screen.

Figure 14:
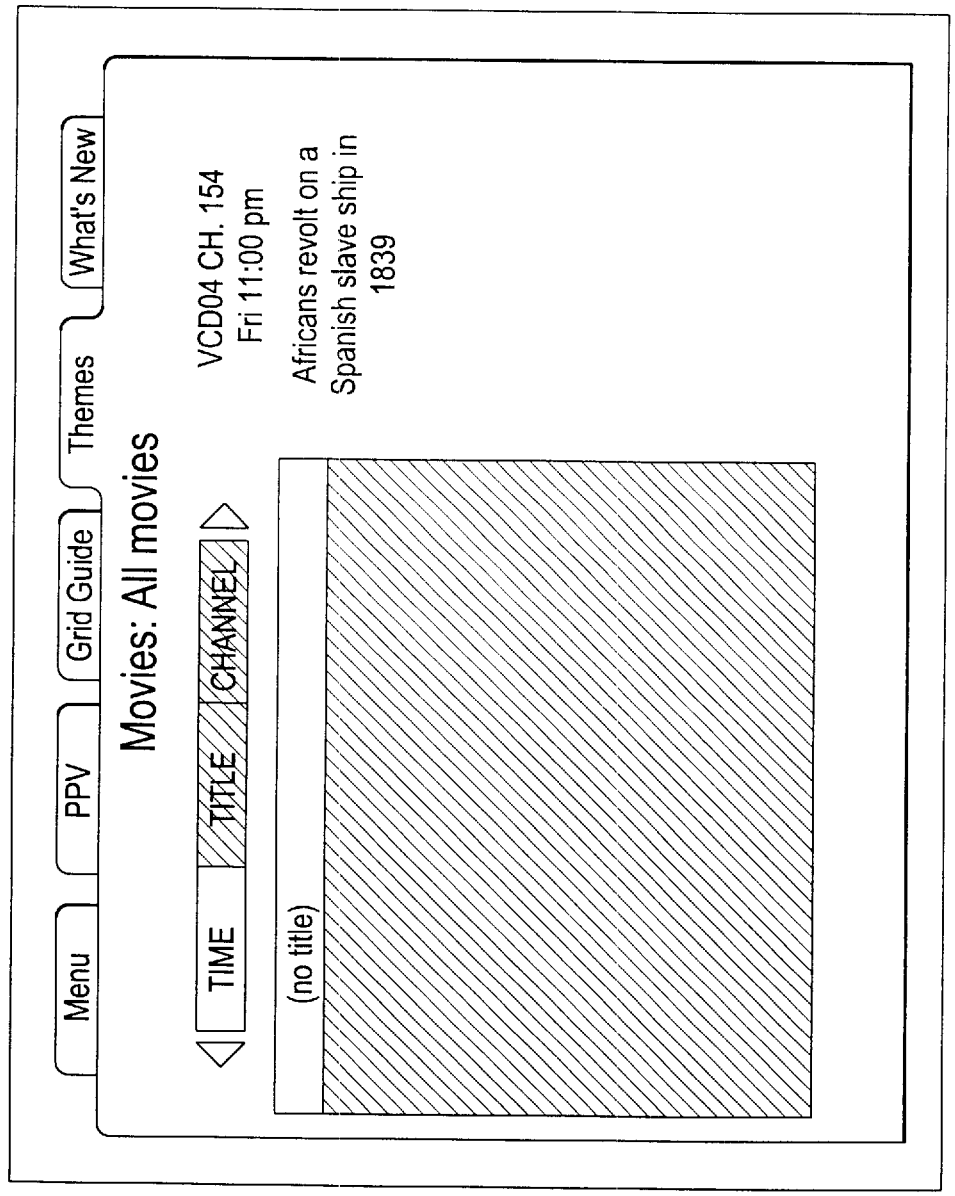
FIG. 14 is a Theme Guide with episode sub-screen.

If the Theme Guide is sorted by time or channel, multiple entries of the same title are each given their own line in the Theme Guide. If the Theme Guide is sorted by title, however, multiple entries of the same title are "compressed" onto one line of the Theme Guide, and the description at the right shows how many episodes' are available and displays as many of them as possible. This is done to avoid having multiple pages of "News," for example, slowing the user down. FIG. 10 shows how 12 episodes of Amistad have been "compressed" onto one line of the theme guide on the left, and the description on the right shows program information for each of the Amistad episodes. If the user presses SELECT, a sub-screen 154 is shown with information for each episode, as shown in FIG. 14. The user can then press EXIT to return to the Theme Guide.

The user navigates the Theme Guide screen similarly to the other Theme screens. Pressing ↓ moves the cursor down one program. If the cursor is on the bottom entry of the page and the user presses ↓, the IPG displays the next page of Theme entries, and the cursor goes to the first entry of the next page. If the user is already at the bottom of the list and presses ↓, the system displays the BOTTOM message at the bottom of the list.

Pressing ↑ moves the cursor up one program. If the cursor is on the top entry of the page and the user presses ↑, the IPG displays the previous page of Theme entries, and the cursor goes to the bottom entry of the previous page. If the user is already at the top of the list and presses ↑, the system displays the TOP message at the top of the list.

In one embodiment of the invention, pressing PAGE↓ displays ten programs following the currently displayed ten programs. The cursor stays on the same row of the list. If the user is already at the bottom of the list and presses PAGE↓, the system displays the BOTTOM message at the bottom of the list.

Pressing PAGE↑ displays the previous programs. The cursor stays on the same row of the list. If the user is already at the top of the list and presses PAGE↑, the system displays the TOP message at the top of the list.

Figure 15:
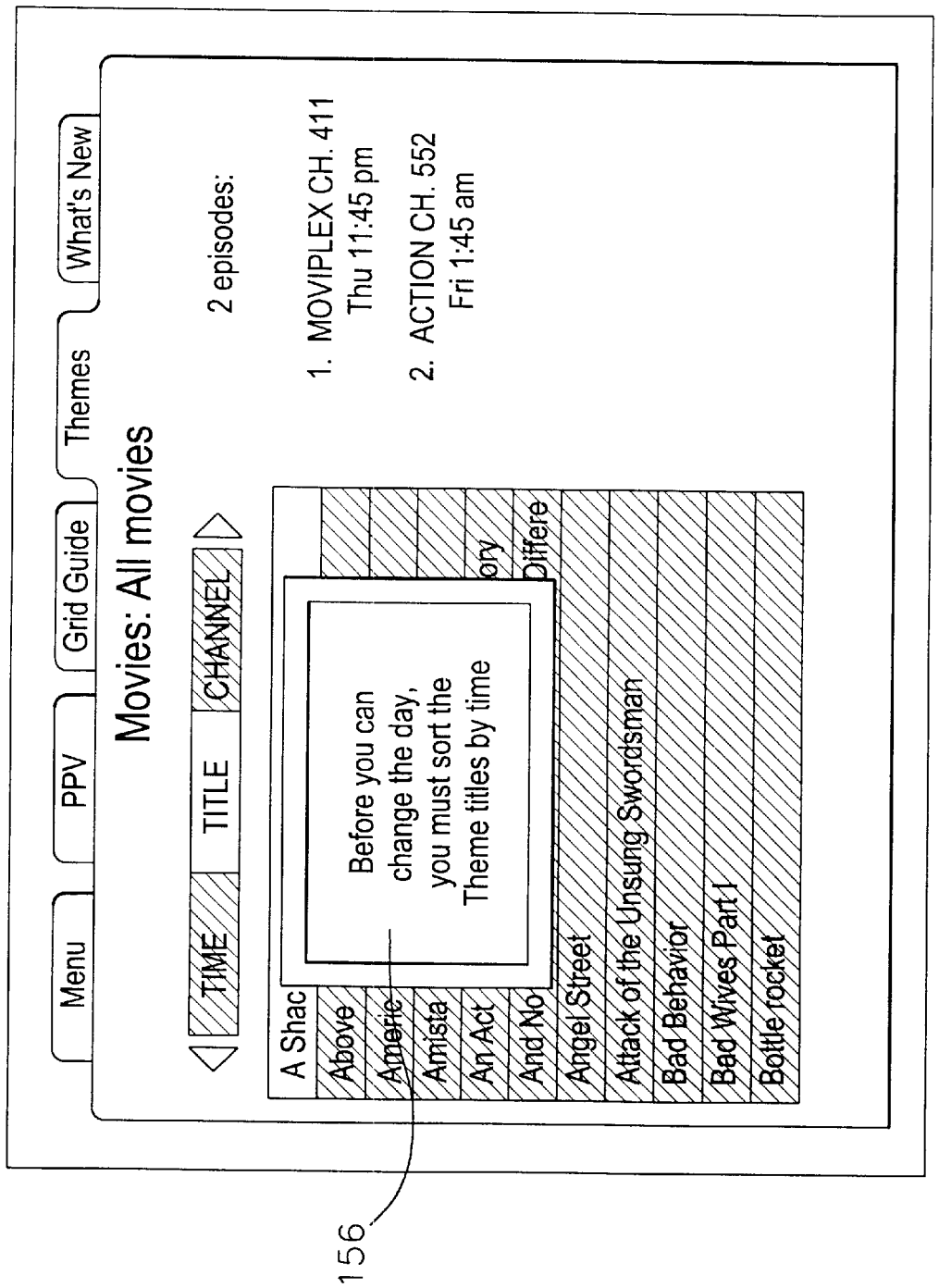
FIG. 15 is a Theme Day warning.

If the user is displaying the Theme Guide sorted by time, pressing DAY → starts the search again for 24 hours beyond cursor time. If the user presses DAY → on the seventh day from the current day and the system does not have any more listings of programs for the subcategory, the system displays the message no title and returns the user to the subcategories screen. Pressing DAY ← starts the search again for 24 hours before cursor time. If the user is displaying the Theme Guide sorted by channel or by title, pressing DAY → or DAY ← causes the Theme Day Warning 156 to be displayed, as shown in FIG. 15.

Figure 16:
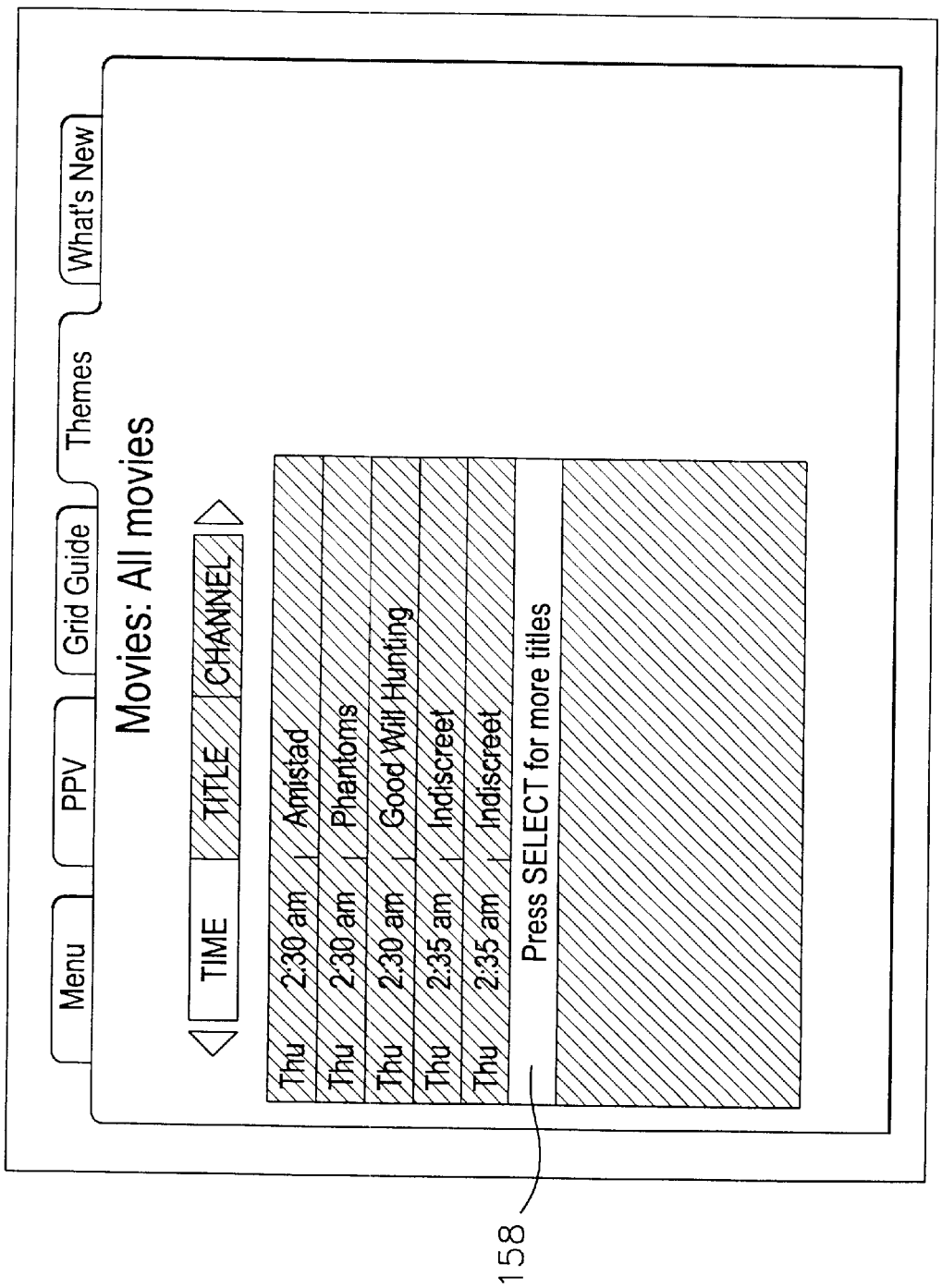
FIG. 16 is "Press SELECT for more titles" command in the last row on a screen when all the programs for the sub-category in the buffer can not be fit in a single screen.

While navigating the Theme Guide, the user may get to a screen that has the message Press SELECT for more titles 158 in the last row on that screen, as shown in FIG. 16. This message tells the user that the system could not fit all the programs for the subcategory in the buffer and that the user can continue the search. To continue the search and to see more programs for the subcategory, the user presses SELECT with the cursor on the row that says Press SELECT for more titles. The system finishes searching the database and displays the next buffer of programs or the rest of the programs for the subcategory. If the cursor is on press SELECT for more titles and the user presses ↓ or PAGE ↓, the system displays the BOTTOM message over the Press SELECT for more titles message.

To sort the program listings by a different option, the user presses the ← or → and the sort indicator moves to the next option on the sort row. The system waits in case the user is continuing to move the sort indicator to the next option, and then begins sorting the list. The IPG displays the "Sorting . . . " pop-up until the sort is complete.

Main Menu

Figure 17:
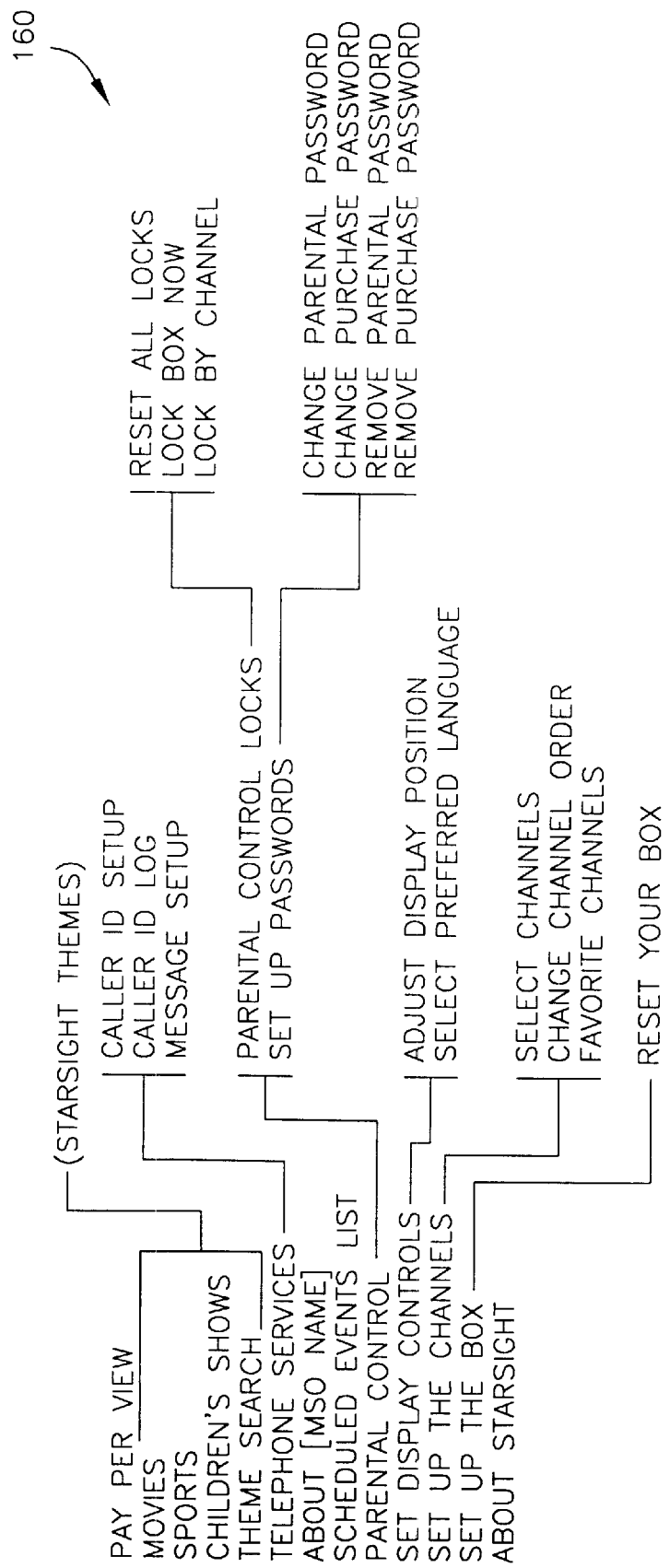
FIG. 17 is a menu system tree.
Figure 18:
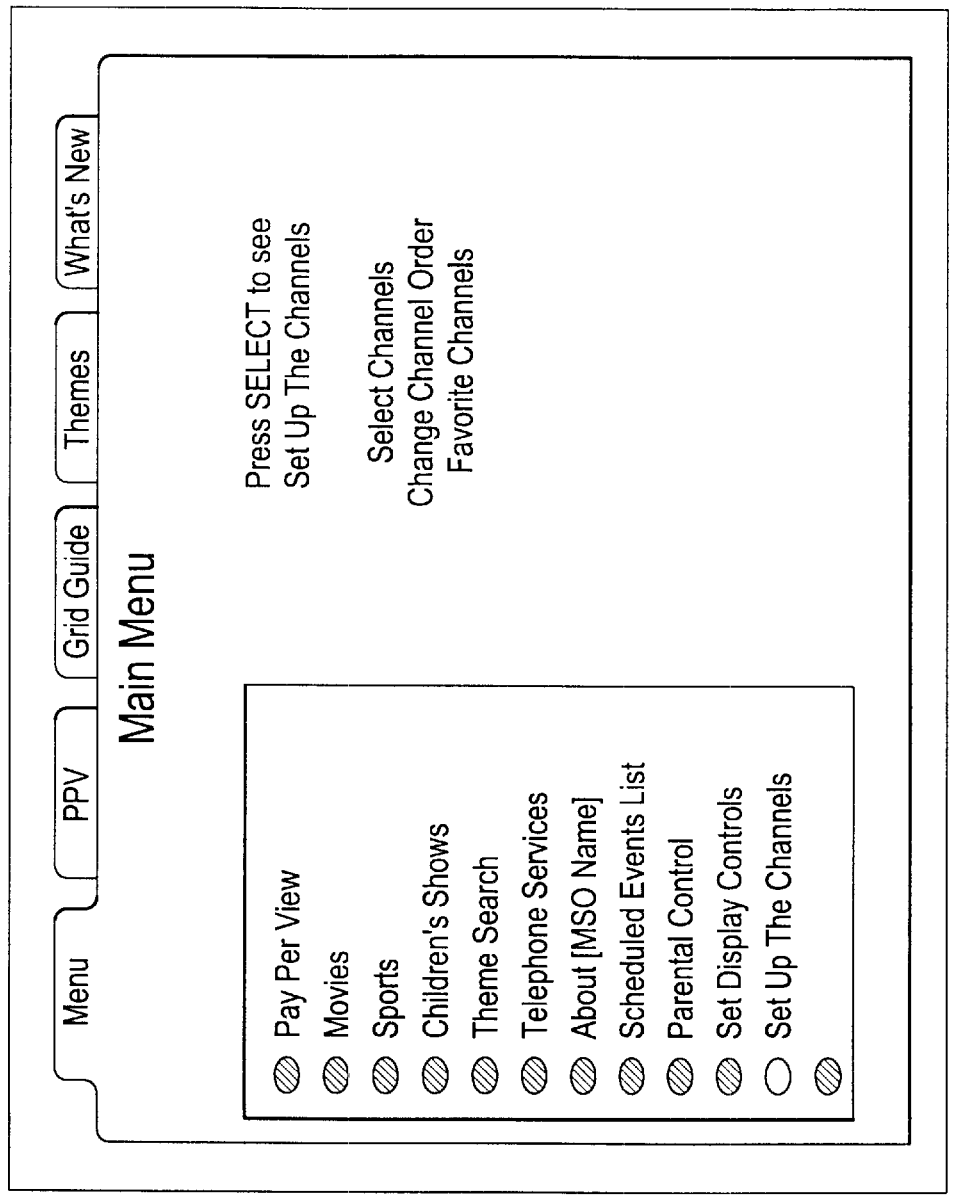
FIG. 18 is a Main menu.

The IPG includes a complete menu system. FIG. 17 shows the complete menu system tree 160. The Main Menu is shown in FIG. 18. The Main Menu 162 enables the user to select options for setting up the IPG and the IPG device. In addition, all major IPG features except the Grid Guide have an entry in the Main Menu. The menu tabs are visible at the very top of the screen. The title banner at the top contains the title Main Menu. In one embodiment of the invention, the listing area shows ten lines per page and includes all the features that have a top-level menu entry. These features include Pay Per View, Movies, Sports, Children's Shows, Theme Search, Telephone Services, About [MSO Name] (this line will reflect the MSO's name in the product), Scheduled Events List, Parental Control, Set Display Controls, Set Up the Channels, Set Up the Box, and About the IPG creator.

In one embodiment of the invention, the Main Menu is opened is few different ways. For example, Pressing MENU on the remote control opens the Main Menu; or Pressing GUIDE on the remote control, causing the Grid Guide to be displayed, and then moving the cursor up to the menu tabs at the top of the screen, moving the cursor over to the "Menu" tab, and pressing SELECT opens the Main Menu.

Figure 19:
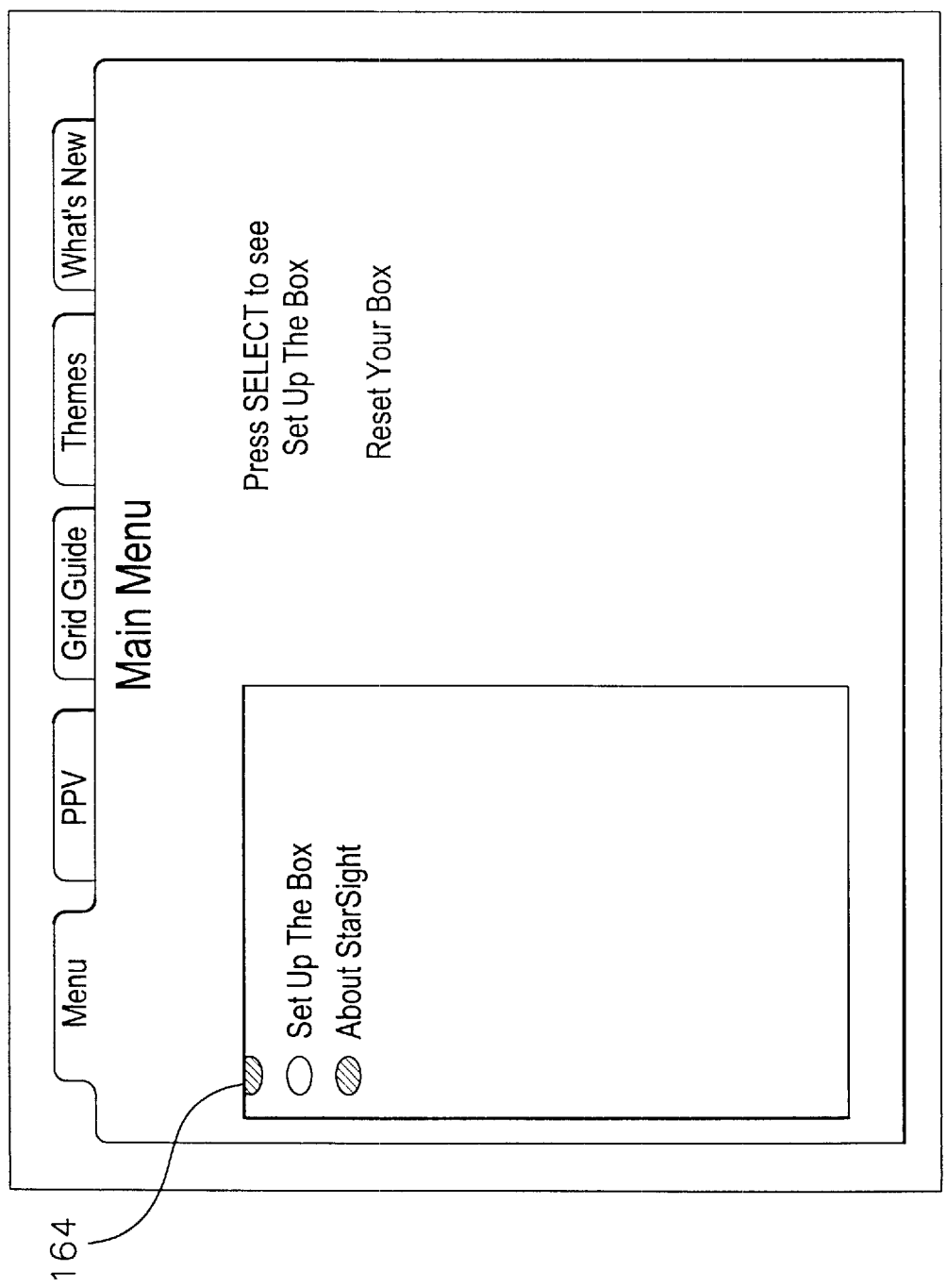
FIG. 19 is a partial menu globe on the Main menu.

When the user first opens the main menu screen, the cursor appears on the first option. If the user selects an option and then comes back to this screen, the cursor remains on the last selected option. As with any scrolling list in the IPG product (other examples include Action pop-ups, the Themes screens, and the Grid Guide itself), it should be apparent at a glance whether or not there are additional items on additional pages. If there is another page below the current page, a small portion of the menu globe will be apparent at the bottom of the screen as a prompt to the user. Similarly, if there are pages above the current page, a small portion of the menu globe 164 will be apparent at the top of the screen as shown in FIG. 19. It is possible for there to be pages both above and below the current page. In that instance, portions of the menu globe would appear at both the top and bottom of the screen.

The Menu sub-items that pertain to the selected feature are displayed on the right of the screen. At the top of the column, the header "Press SELECT to see" and the feature name direct the user to the feature. If the feature has sub-items (for example. "Movies" would be a sub-item under "Theme Search"), then the list of sub-items are displayed underneath the feature name on the right-hand side to show the user what sorts of things can be done. As the user moves the cursor from menu item to menu item, the sub-items at the right change, so that the user can anticipate what will happen if the feature is selected. If there are more sub-items than can fit on the page, the word "more . . . " is displayed at the bottom of the column, so that the user looking for a particular sub-item is not mislead into thinking that all the sub-items are being displayed.

Preferably, most of the menu screens are drawn without help text, because the inclusion of the sub-menu column makes most of the menu items self-explanatory. For those screens in which additional help text is necessary, help text is displayed at the bottom of the sub-menu column.

In one embodiment of the invention, the menu tabs at the top of the Main Menu allow the user easy access to at least five important features from any screen. Two of these features, the Main Menu and the Grid Guide, are preferably non-configurable. The other three features may be configured by the MSO, in order to spotlight features that may benefit the user that may not be easy to access any other way. The other three features can be the PPV Guide, the "About the MSO" screen (What's New), and Themes.

Pay-Per-View Ordering

Pay-Per-View ordering usually involves conflict resolution, because the guide is required to tune to the PPV channel at the start of a purchased event, and the guide must be aware of any other scheduled events that take place at the same time. However, in another embodiment of the invention, the ordering of PPV is handled at the network level and the IPG merely provides the UI to the scheduled purchases to display in the guides and in a Scheduled Events List as shown in FIG. 31.

Caller ID

The Caller ID feature includes three major components:

1. A pop-up that displays over a TV state or any guide screen, which identifies somebody calling as the phone is ringing;
2. A menu that allows the user to configure the display options for the Caller ID pop-up; and
3. A list screen that shows a log of past callers.

Figure 20:
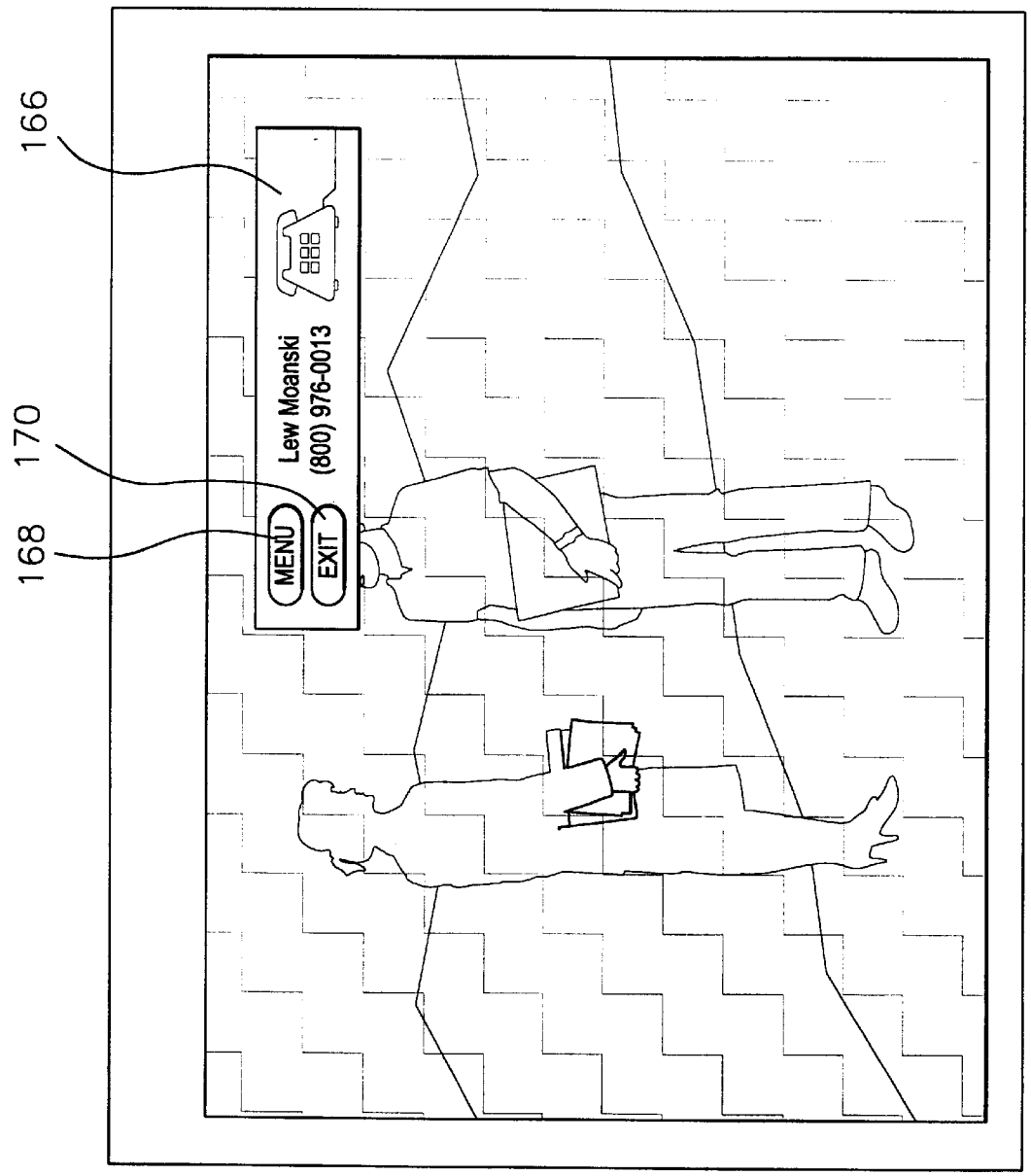
FIG. 20 is a caller ID pop-up.
Figure 21:
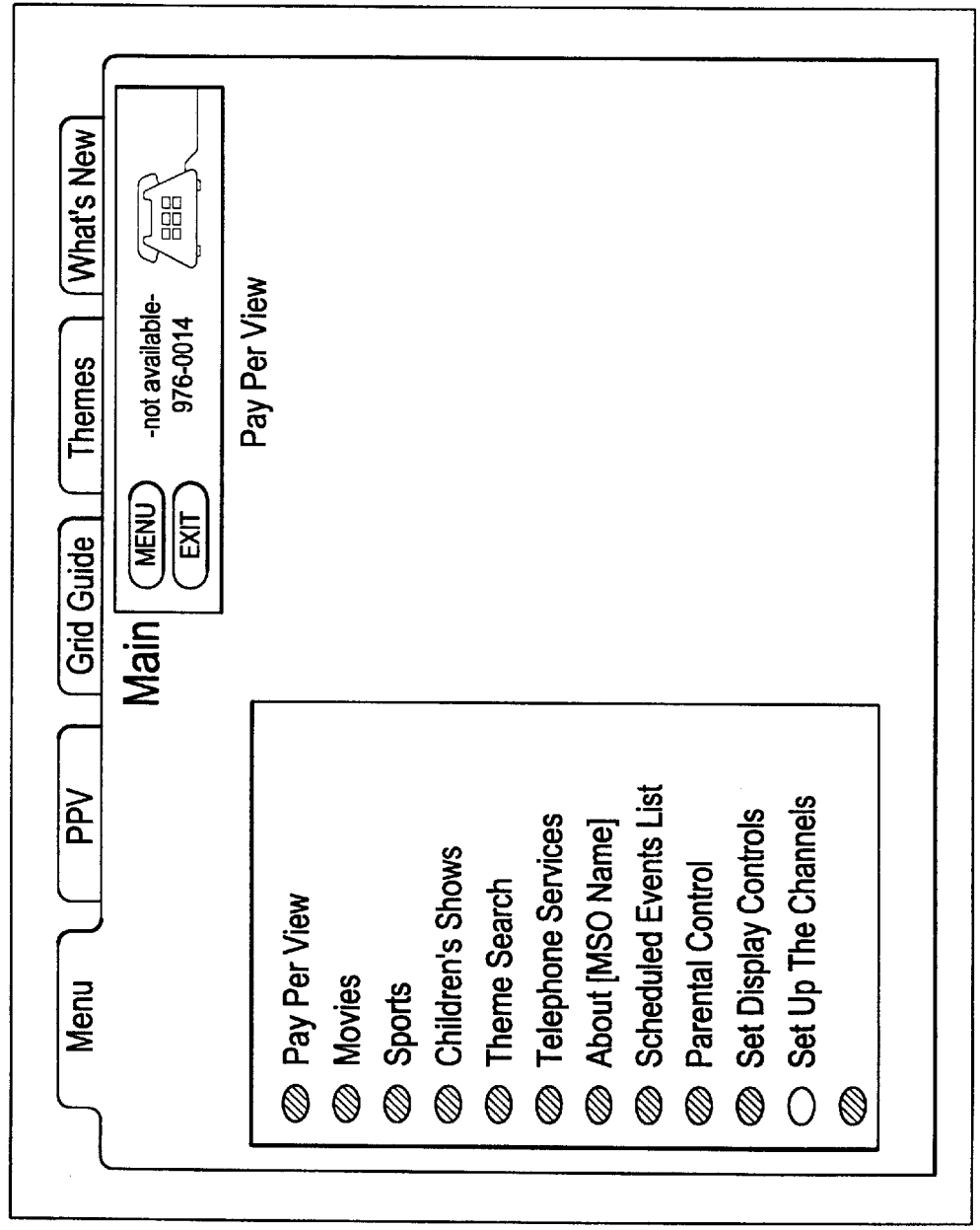
FIG. 21 is a caller ID pop-up over a guide screen.

FIG. 20 shows a caller ID pop-up 166 overlaid on a full screen television program. When somebody calls the user on the telephone while the user is watching television, the IPG displays a caller ID pop-up. The elements of the pop-up comprises: A selectable "MENU" button 168, a selectable "EXIT" button 170, the caller's name (if available), the phone number from which the caller is calling (if available), and a phone icon, which could be animated to reinforce its relationship to the ringing phone. FIG. 21 shows a caller ID pop-up overlaid on a guide screen. If the pop-up is drawn over a guide screen, the pop-up is deliberately drawn low enough on the screen so as not to obscure the Menu headers.

If the user presses SELECT while the "EXIT" button is highlighted, the pop-up is cleared from the screen. If the user moves the cursor to "MENU" and presses SELECT, the Telephone Services menu is displayed. The pop-up times out in less than 60 seconds. The actual number of seconds for which the pop-up is displayed can be selected on the "Caller ID Setup" menu.

Message Waiting Pop-up

Whenever there is a message to which the user has not yet listened, the network sends a message to the residential gateway. At given periods throughout the day (no less frequently than every half-hour), the IPG displays a pop-up overlaid on the television program being watched, as shown in FIG. 22, overlaid on the television program being watched.

Figure 22:
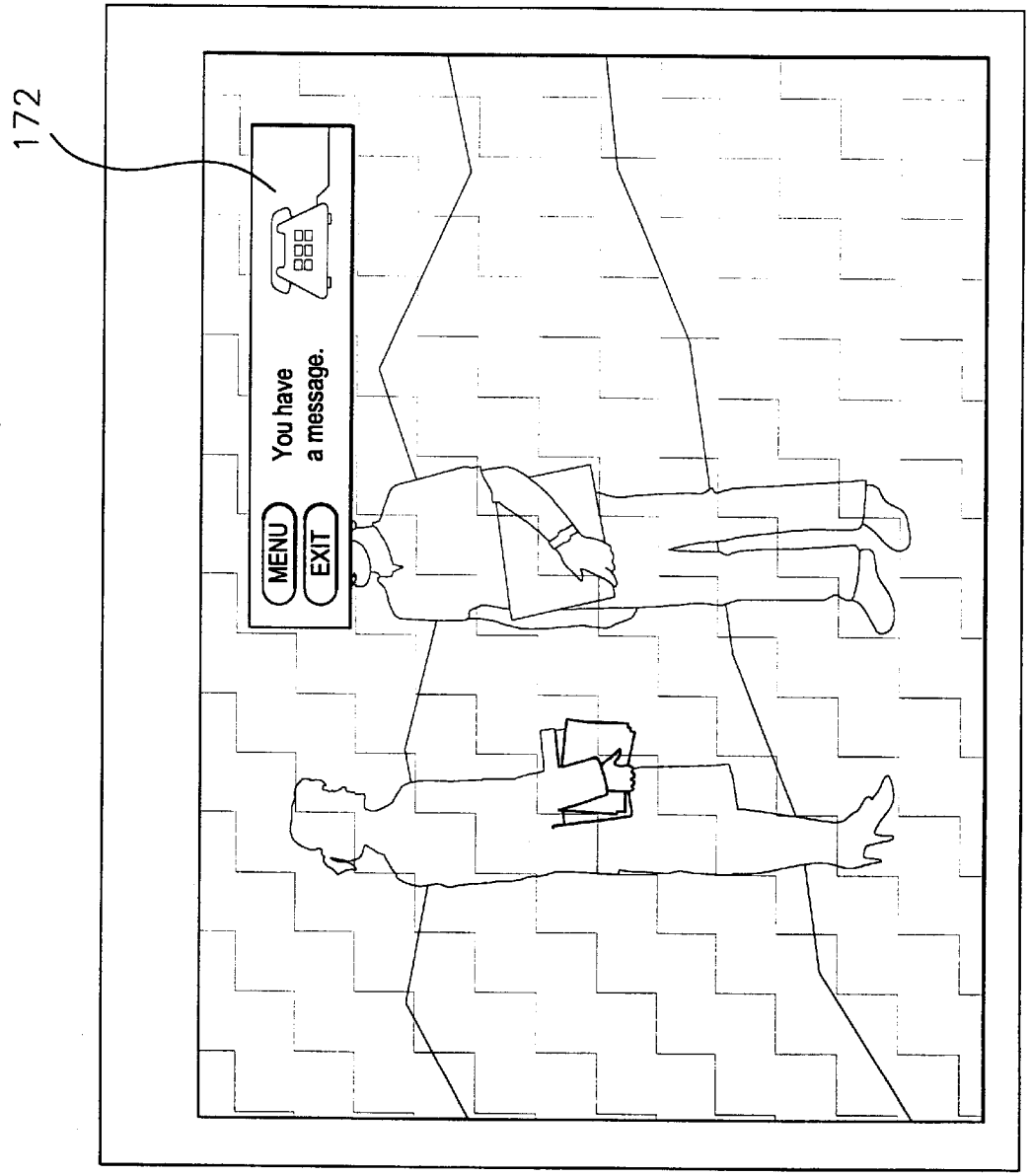
FIG. 22 is a message waiting pop-up.

Similar to the Caller ID pop-up, the Message Waiting pop-up 172 displays in the position shown in FIG. 22. The Message Waiting pop-up is displayed exactly as the Caller ID pop-up is displayed, for the same duration and with the same properties, except that the text field says "You have a message" instead of indicating a name or number.

Telephone Services Menu

Figure 23:
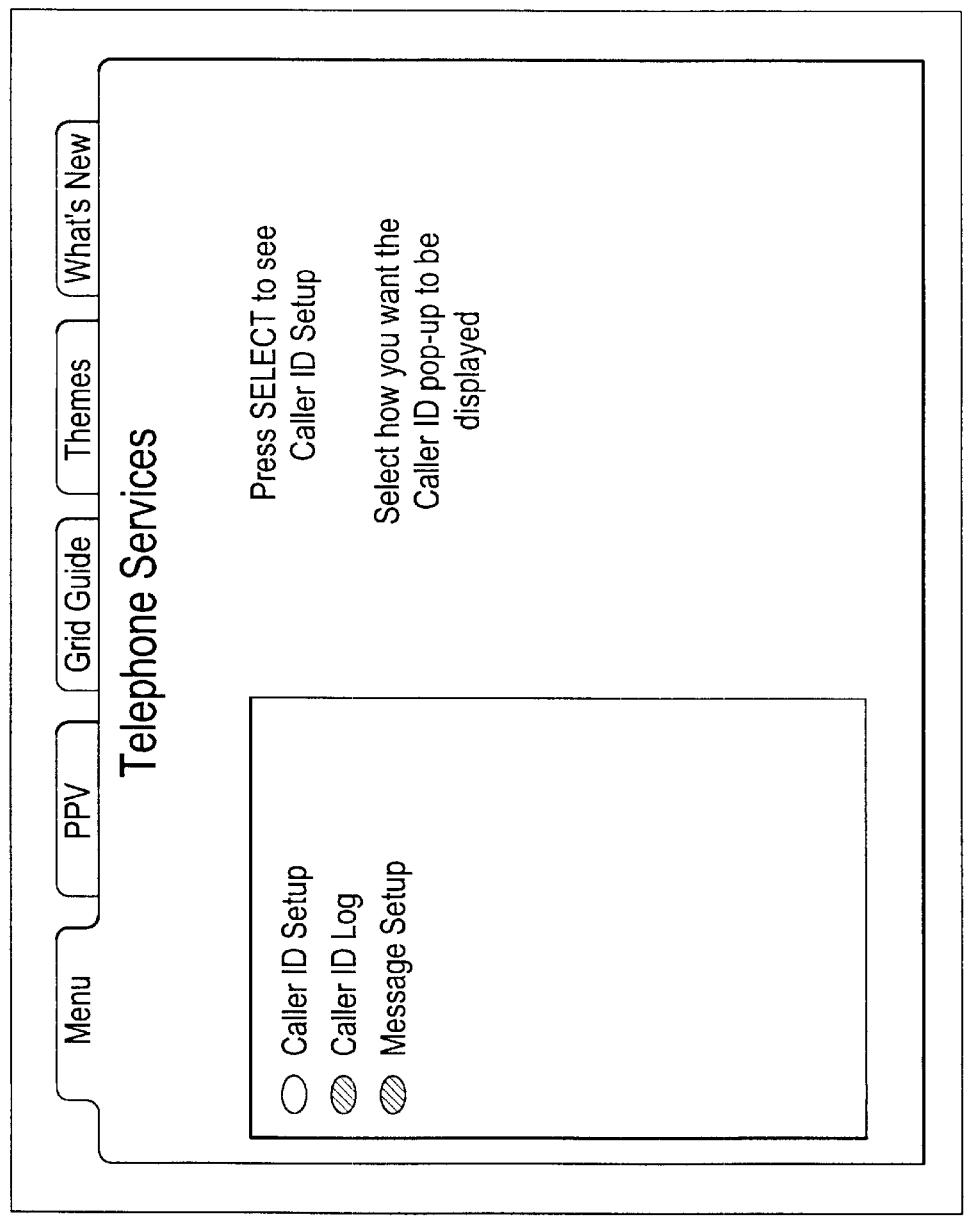
FIG. 23 is a Telephone Services menu.

FIG. 23 shows a Telephone Services menu 174. The Telephone Services menu includes all of the options available to the user for configuring either the Caller ID pop-up or the Message Waiting pop-up, as well as viewing the Caller ID log. The user can bring up the Telephone Services menu in several ways. For example, Selecting Telephone Services from the Main Menu brings up the Telephone Services menu. In particular, from the TV state, the user can press MENU or GUIDE on the remote to display the Main Menu. The user then presses the ↑ or ↓ keys on the remote to move the cursor to the menu tabs. The user presses the ← or → keys to move the cursor to the "MENU" menu tab and presses SELECT. The user presses the ↑ or ← keys to move the cursor to the Telephone Services menu. Finally, the user presses select to display the Telephone Services menu.

In the alternative, selecting the "MENU" button on either the Caller ID or Messages Waiting pop-up also brings up the Telephone Services menu. The Telephone Services menu can also be entered by first pressing CALL ID to display the Caller ID pop-up, second using the UP or DOWN keys to move the cursor to the Menu button, and finally pressing SELECT to display the Telephone Services menu.

Once the user selects the Telephone Services menu, it is displayed, as shown in FIG. 23. In the preferred embodiment, the Telephone Services menu is comprised of three options: (1) Caller ID Setup, Caller ID Log, and Message Setup. As with every menu screen, the user can select an option from the menu by pressing ↑ or ←. to highlight an option and then SELECT to choose it.

At the bottom of the sub-menu column is an area that displays help text for each menu option. As the user moves the cursor from option to option, the help text changes to describe the menu options. The following is a list of the menu options and the help text that appears with each option:

Caller ID Setup. Select how you want the Caller ID pop-up to be displayed.

Caller ID Log. See a log of the people who have called you.

Message Setup. Select how you want the Message pop-up to be displayed.

Caller ID Setup Screen

The Caller ID Setup Screen is entered by selecting the Caller ID Log option from the Telephone Services menu.

Figure 24:
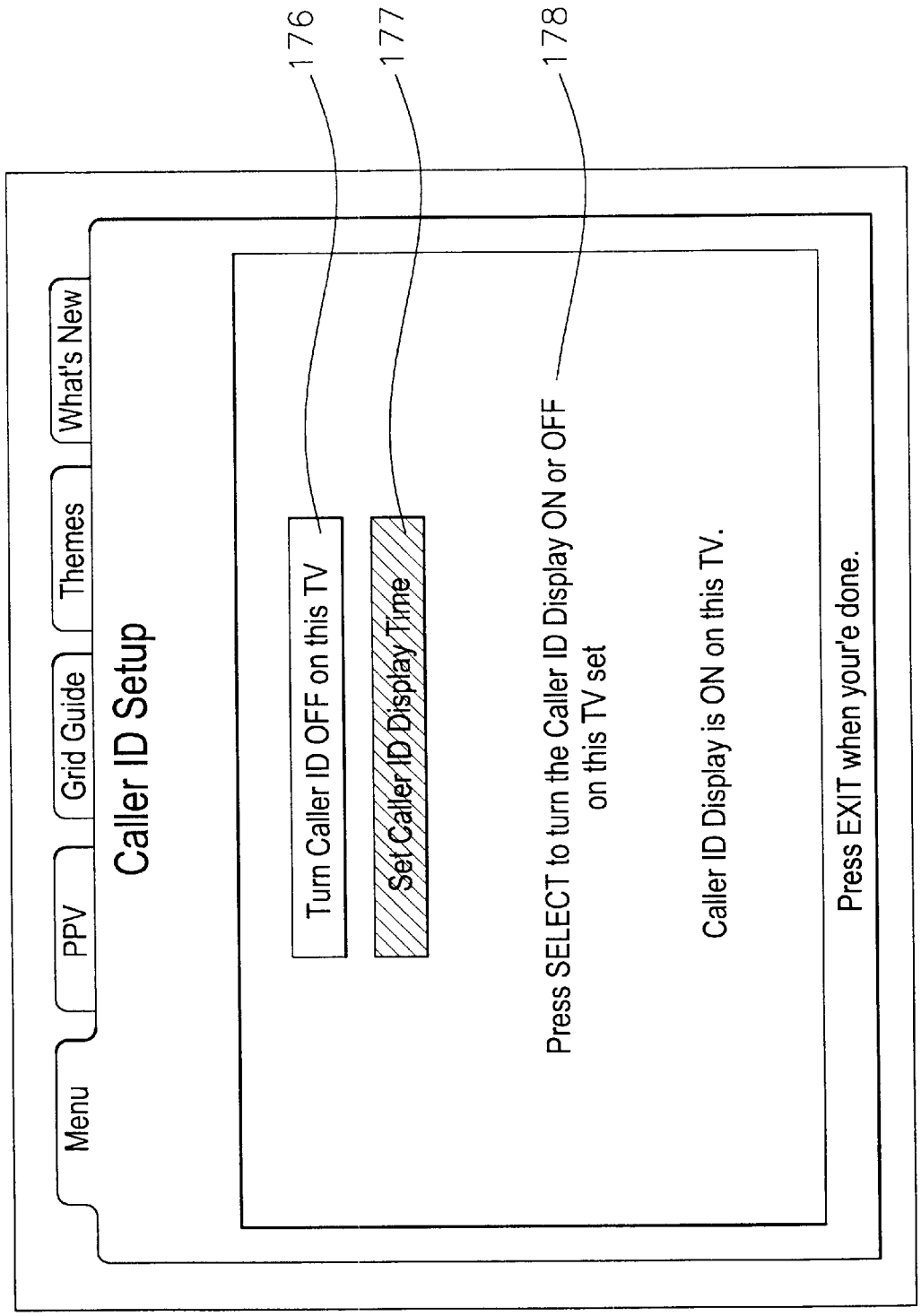
FIG. 24 is a caller ID setup (Turn Caller ID OFF).

FIG. 24 shows a caller ID setup where the Caller ID is off on the television. If the user selects Caller ID Setup from the Telephone Services menu, the Caller ID Setup screen is displayed, as shown in FIG. 24. Tin one embodiment, there are two options for configuring the display of the Caller ID pop-up. The first option, Turn Caller ID Off on this TV 176, allows the user to turn off the Caller ID pop-up on a given source. (If the household is not configured for multi-source, this option is grayed-out.) The second option, Set Caller ID Display Time 177, allows the set the duration of the display screens. The help text 178 at the bottom of the screen explains the item to the user and displays the current state of the Caller ID display.

Figure 25:
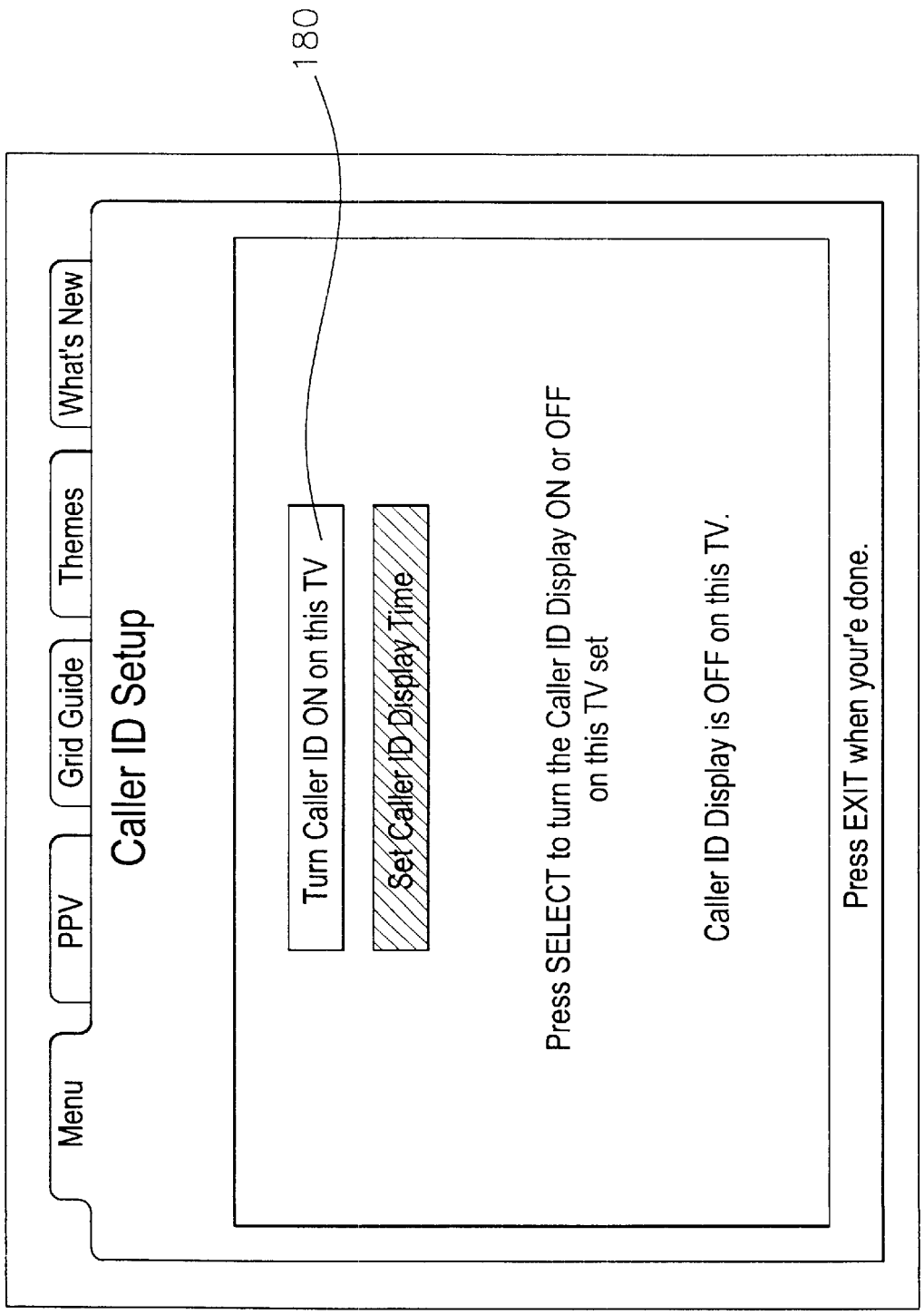
FIG. 25 is a caller ID setup (Turn Caller ID ON).

FIG. 25 shows a caller ID setup after the Caller ID is turned on. If the user presses SELECT when the Caller ID is off, the menu option changes to Turn Caller ID on this TV 180 and the help text changes to reflect the new state of the Caller ID display, as shown in FIG. 25. The user can still display the Caller ID pop-up by pressing the CALL ID key on the remote.

Figure 26:
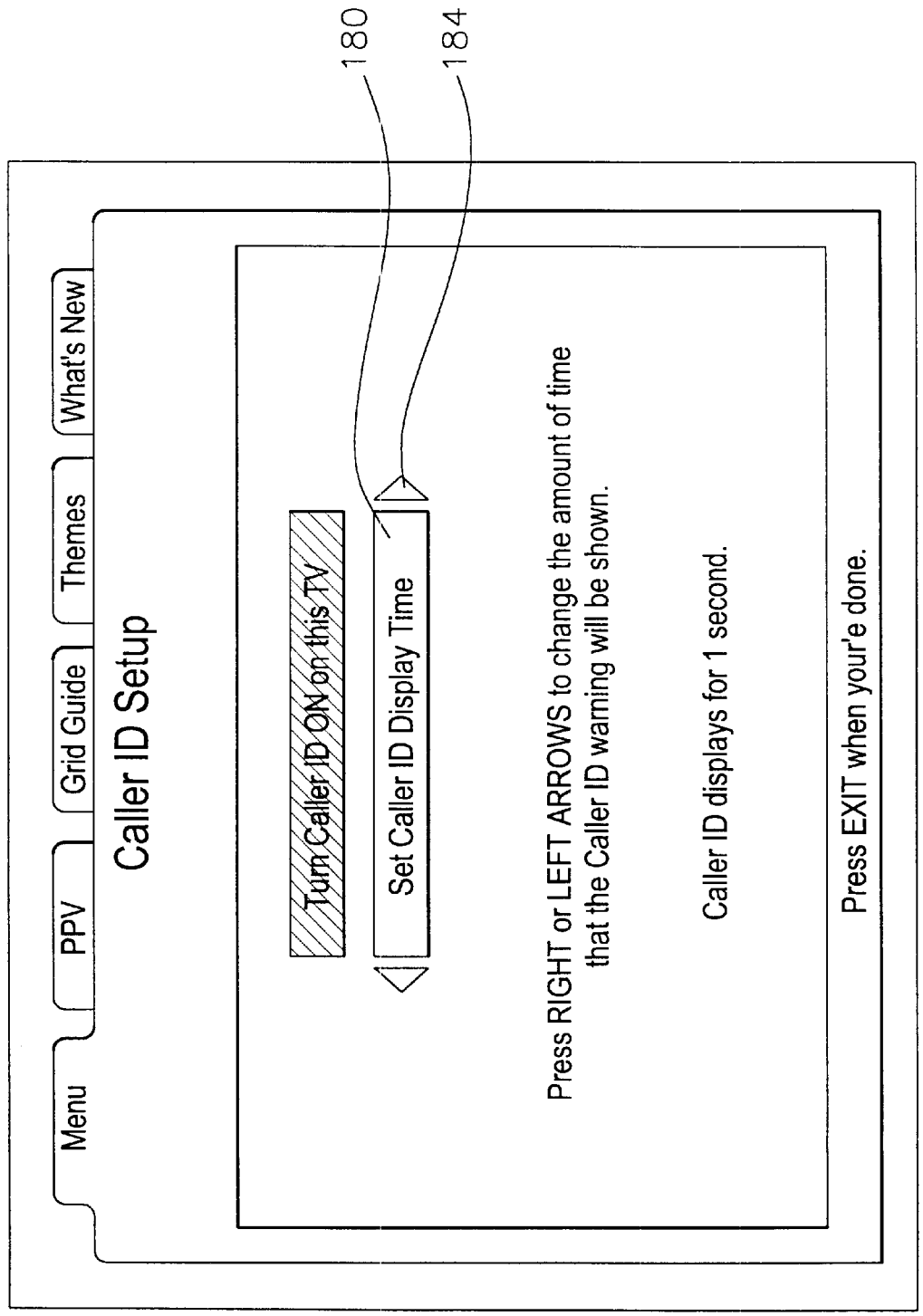
FIG. 26 is a caller ID setup (Set Caller ID Display Time).

Finally, the second option, Set Caller ID Display Time 182, has help text 178 and graphical arrows 184, as shown in FIG. 26.

The second option shows the user both graphically (as shown by the arrows) and verbally (as shown by the text) that the display duration can be adjusted. In one embodiment, the display duration can be adjusted in one-second increments from one to fifty-nine seconds when the Caller ID Setup is displayed. After placing the cursor over the Set Caller ID Display Time, arrows are displayed both to the left and to the right of the Set Caller ID Display Time. The left arrow indicates that the display duration can be decremented by pressing the ← key on the remote. The right arrow indicates that the display duration can be incremented by pressing the → key on the remote. Pressing the ← key on the remote decrements the display duration one second and pressing the → key on the remote increments the display duration one second. To exit the Caller ID Setup screen and return to the Telephone Services menu, the user presses EXIT. The ← is the LEFT key. The → is the RIGHT key.

Caller ID Log

When the user displays a Caller ID Log (see below), the IPG shows an aggregate list. If two users have the Caller ID Log displayed on different sources and one user deletes a message, the deletion does not occur on the log of the other source until that user closes the log.

The Caller ID Log is entered by selecting the Caller ID Log option from the Telephone Services menu. The Caller ID Log shows the user a list of the last N number of calls he or she has received, in reverse-chronological order (that is, the most recent call is displayed at the top of the list) where N can be a preset number or a user-defined number.

In one embodiment of the invention, there exists a third field, Set Number of Calls, on the Caller ID Setup screen for entering a user-defined number N. The third field operates much like the second field, Set Caller ID Display Time, operates.

That is, after the user places the cursor over the Set Number of Calls, arrows are displayed both to the left and to the right of Set Number of Calls. The left arrow indicates that the number of calls N can be decremented by pressing the ← key on the remote. The right arrow indicates that the number of calls N can be incremented by pressing the RIGHT key on the remote. Pressing the ← key on the remote decrements the number of calls N and pressing the → key on the remote increments the number of calls N.

In another embodiment, the preset number N is 50. Where the user already has the limit of N calls logged and receives a new Call, that call is displayed at the top of the log, and the N+1 item is deleted from the bottom of the log. Where the preset number N is 50, the 51st item is deleted from the bottom of the log.

In yet another embodiment, the number of calls N is MSO-defined rather than user-defined, and is configured by the MSO at the network level.

The user can also delete items from the log selectively. In the preferred embodiment of the invention, the Caller ID Log is not protected by a Parental Control password.

Figure 27:
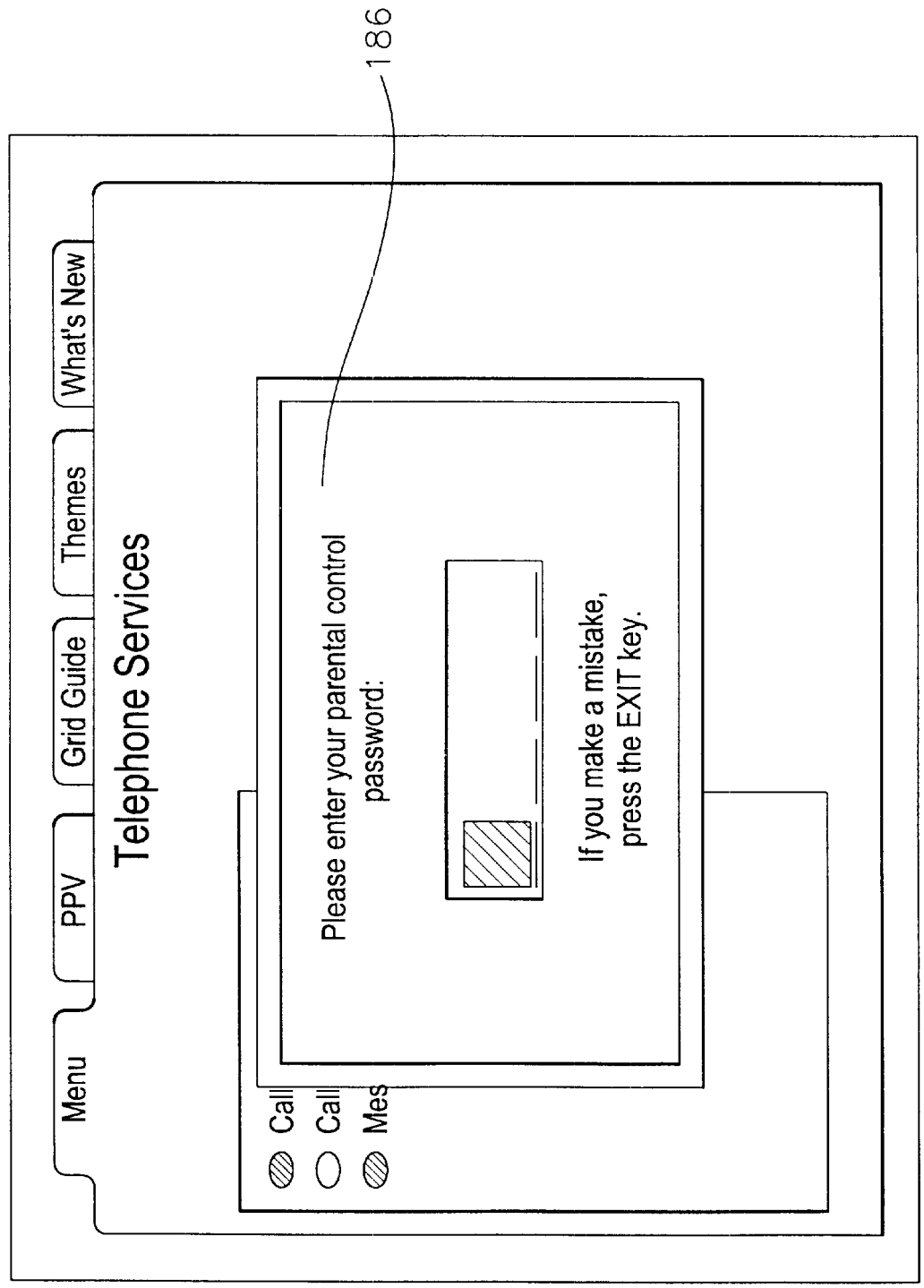
FIG. 27 is a parental password prompt for the Caller ID Log.

In an alternative embodiment of the invention, the Caller ID Log is protected by the Parental Control password. The Parental Control password is set from a Parental Control menu. If the user has set a password, then the IPG asks for the password when the user selects caller ID log from the Telephone Services menu. FIG. 27 shows a parental password prompt 186 for the Caller ID Log. Once the user correctly enters the password, the Caller ID Log 188 is displayed, as shown in FIG. 28.

If an embodiment does not include a Parental Control password, then the Caller ID Log is displayed when the Caller ID Log is selected from the Telephone Services menu.

When the Caller ID Log is displayed, the cursor defaults to the top entry in the list, which is the most recent available entry. The following information is displayed on the log:
- the name of the caller (if available);
- the phone number of the caller;
- the date of the call; and
- the time of the call.

Calls that were logged the last time the user brought up the Caller ID Log are shown with a blue background. New calls that have been added to the list since the last time the user displayed the Caller ID Log are shown with a red background.

Figure 29:
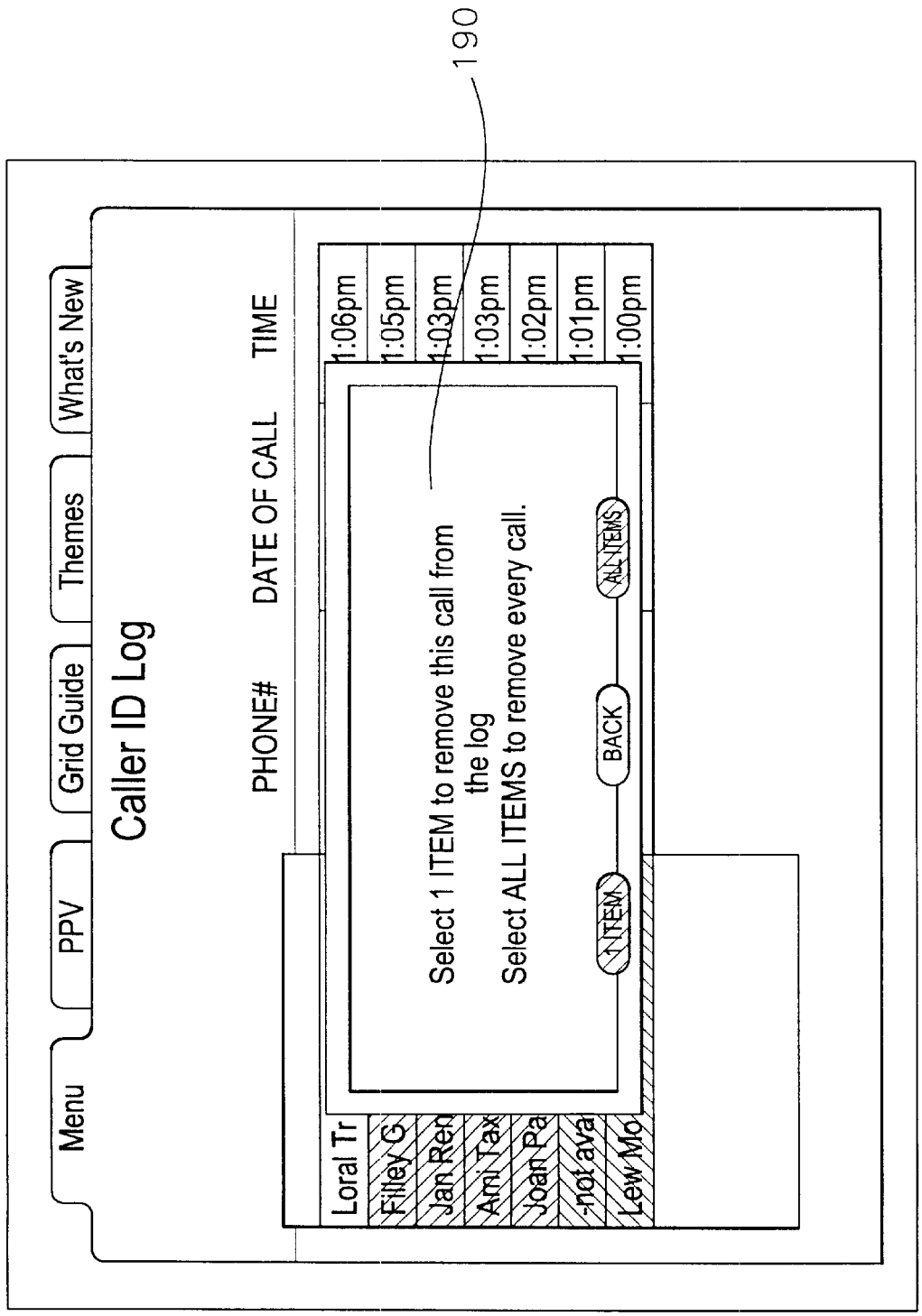
FIG. 29 is a Delete item from Caller ID Log pop-up.

FIG. 29 shows the Delete item from Caller ID Log pop-up 190, which is displayed if the user presses SELECT on any of the calls. The Caller ID Log pop-up allows the user to select whether or not to delete the item, clear the whole list, or return to the list.

Message Setup Screen

Figure 30:
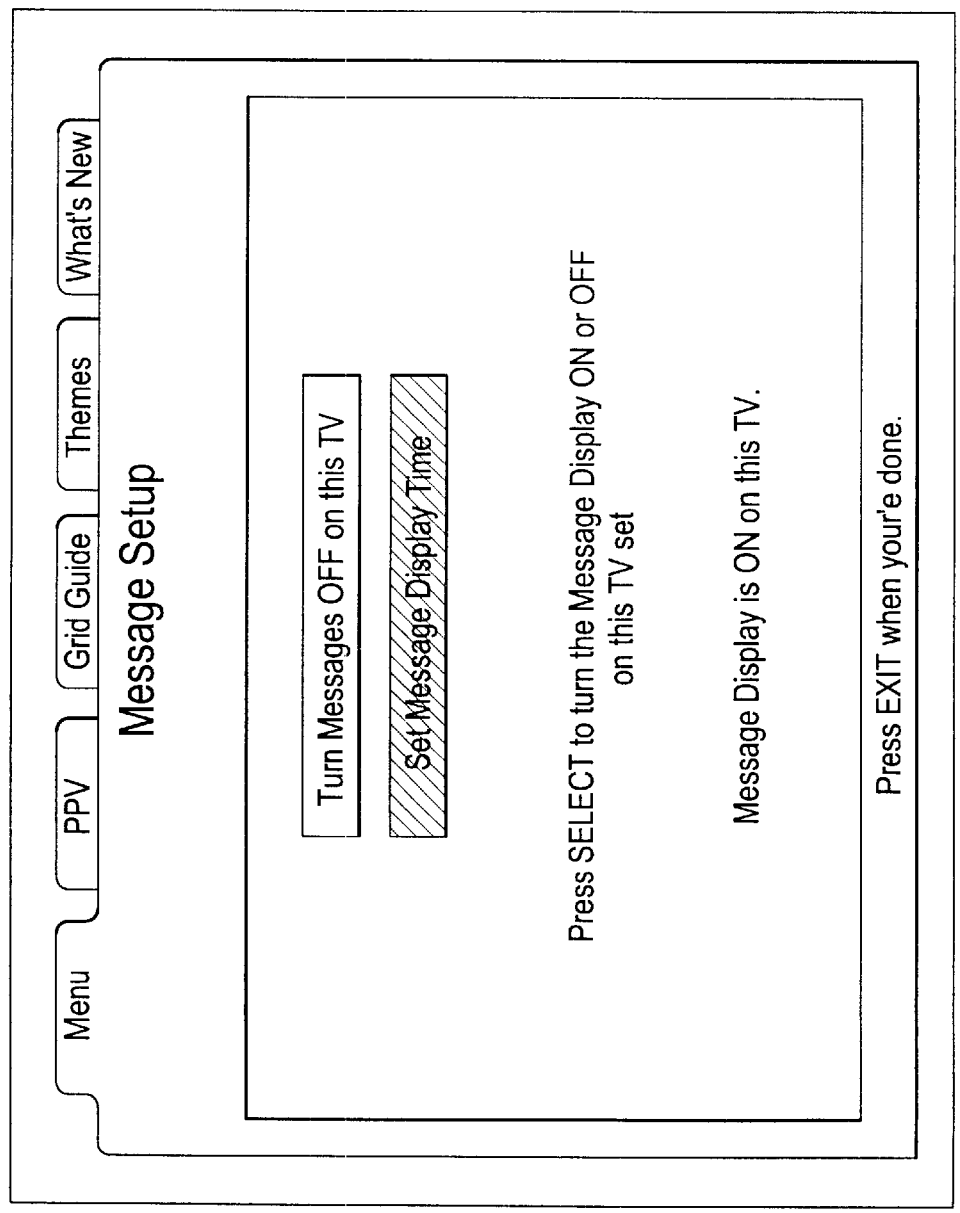
FIG. 30 is a Messages Setup for turning messages off/on and setting the message display time.

If the user selects Message Setup from the Telephone Services menu, the Message Setup screen 192 is displayed. The options and layout of this screen are exactly the same as for the Caller ID Setup screen. The first option on this screen is whether to turn messages off/on the television and the second option lets the user set the message display time, as shown in FIG. 30.

While there have been described herein what are considered to be preferred and exemplary embodiments of the present invention, other modifications of the invention shall be apparent to those skilled in the art from the teachings herein, and it is, therefore desired to be secured in the appended claims all such modifications and extensions as fall with within the true spirit and scope of the invention. The invention is to be construed as including all embodiments thereof that fall within the scope of the appended claims and the invention should only be limited by the appended claims below. In addition, one skilled in the art will readily appreciate that other applications may be substituted for those set forth herein without departing from the spirit and scope of the present invention.

What is claimed is:

1. A system for managing a plurality of interactive electronic program guides (IPGs) each including television channel identifications, program titles, and starting times, comprising:
   an IPG data extractor for receiving telecast data and extracting IPG data from the telecast data for the plurality of IPGs;
   a first database for storing information specific to each of the plurality of IPGs;
   a second database for storing information common to the plurality of IPGs;
   a memory for storing the first database and the second database;
   a microprocessor coupled to the memory for processing the information for the plurality of IPGs, wherein the IPG data extractor, the first database, the second database, the memory, and the microprocessor reside in a single electronic device;
   a plurality of tuners coupled to the microprocessor for receiving the telecast data and tuning to a plurality of television channels respectively; and
   a plurality of displays for displaying the telecast data for the plurality of television channels respectively.

2. The system of claim 1 wherein the plurality of displays simultaneously display the telecast data of different television channels respectively.

3. The system of claim 1 further comprising an on-screen cheduled events list shared by the plurality of IPGs and including an aggregate list for individual recordings, future PPV purchases, and scheduled tunes.

4. The system of claim 1 further comprising means for customizing each of the plurality of IPGs.

5. The system of claim 4 wherein the means for customizing includes means for displaying a sorted list of the television channel identifications based on favorite channels.

6. The system of claim 4 wherein the means for customizing includes means for displaying only selected television channel identifications.

7. The system of claim 4 wherein the customization data for each of the plurality of IPGs is stored in a plurality of user profiles respectively.

8. The system of claim 1 further comprising at least one VChip coupled to the microprocessor for parental blocking of television programs based on a user-defined criterion.

9. The system of claim 8 wherein the VChip blocks the television programs based on a plurality of ratings, the channel identifications, the program titles, or the starting times.

10. The system of claim 1 further comprising means for supporting a hierarchy of multiple user passwords.

11. The system of claim 10 wherein the hierarchy of multiple user passwords includes a master password for allowing a user with the master password to block television programs, make changes to the plurality of IPGs, or override changes to the plurality of IPGs.

12. The system of claim 1 wherein the IPG data extractor, the memory, the microprocessor, and the plurality of tuners are embodied in a single package.

13. A method for displaying a plurality of interactive electronic program guides (IPGs) in a guide format comprising the steps of:
   receiving television programming data including IPG data by an electronic device;

extracting IPG data for the plurality of IPGs from the television programming data by the electronic device;

storing in a memory data specific to each of the plurality of IPGs;

storing in the memory data common to the plurality of IPGs;

processing the data for the plurality of IPGs by the electronic device; and displaying the plurality of IPGs on a plurality of displays respectively.

14. The method of claim 13 wherein the displaying step includes simultaneously displaying the television programming data for different television channels respectively.

15. The method of claim 13 further comprising displaying a scheduled events list shared by the plurality of IPGs and including an aggregate list for individual recordings, future PPV purchases, and scheduled tunes.

16. The method of claim 13 further comprising customizing each of the plurality of IPGs.

17. The method of claim 16 wherein the step of customizing includes displaying a sorted list of television channel identifications based on favorite channels.

18. The method of claim 16 wherein the customizing step includes displaying only selected television channel identifications.

19. The method of claim 16 wherein the customizing step includes storing in a plurality of user profiles data for each of the plurality of IPGs respectively.

20. The method of claim 13 further comprising the step of blocking television programs based on a user-defined criterion using at least one VChip coupled to the microprocessor.

21. The method of claim 20 wherein the blocking step includes blocking television programs specific to one of the plurality of IPGs.

22. The method of claim 20 wherein the blocking step includes blocking television programs specific to a user.

23. The method of claim 13 further comprising supporting a hierarchy of multiple user passwords.

24. The method of claim 23 wherein the step of supporting a hierarchy of multiple user passwords includes allowing a user with a master password to block television programs, make changes to the plurality of IPGs, or override changes to the plurality of IPGs.

25. A television set-top box for generating a plurality of interactive electronic program guides (IPGs) each including television channel identifications, program titles, and starting times, comprising:

an IPG data extractor for receiving telecast data and extracting IPG data from the telecast data for the plurality of IPGs;

a first database for storing information specific to each of the plurality of IPGs;

a second database for storing information common to the plurality of IPGs;

a memory for storing the first database and the second database;

a single microprocessor coupled to the memory for processing the information for the plurality of IPGs; and a plurality of tuners coupled to the microprocessor for receiving the telecast data and tuning to a plurality of television channels respectively.

26. A system for managing a plurality of interactive electronic program guides (IPGs) each including television channel identifications, program titles, and starting times, comprising:

an IPG data extractor for receiving telecast data and extracting IPG data from the telecast data for the plurality of IPGs;

a first database for storing information specific to each of the plurality of IPGs;

a second database for storing information common to the plurality of IPGs;

a memory means for storing the first database and the second database;

a microprocessor means coupled to the memory means for processing the information for the plurality of IPGs, wherein the IPG data extractor, the first database, the second database, the memory, and the microprocessor reside in a single electronic device;

a plurality of tuners coupled to the microprocessor for receiving the telecast data and tuning to a plurality of television channels respectively; and an on-screen scheduled events list shared by the plurality of IPGs including an aggregate list for at least one of individual recordings, future PPV purchases, or scheduled tunes.

* * * * *